US011518630B2

(12) United States Patent
Zoghzoghy et al.

(10) Patent No.: US 11,518,630 B2
(45) Date of Patent: Dec. 6, 2022

(54) AUTOMATED UNLOADING AND LOADING ROBOT SYSTEM WITH TELESCOPING MAST, Z-AXIS CONTROL AND CONVEYOR-NESTING GRIPPER

(71) Applicant: Bastian Solutions, LLC, Indianapolis, IN (US)

(72) Inventors: Joe G. Zoghzoghy, Dallas, TX (US); Chase Christian Grigsby, Mansfield, TX (US); Aaron James Plauche, Plano, TX (US); Kendall Prewitt, Mesquite, TX (US)

(73) Assignee: Bastian Solutions, LLC, Indianapolis, IN (US)

( * ) Notice: Subject to any disclaimer, the term of this patent is extended or adjusted under 35 U.S.C. 154(b) by 298 days.

(21) Appl. No.: 15/929,963

(22) Filed: May 30, 2020

(65) Prior Publication Data

US 2020/0377317 A1 Dec. 3, 2020

Related U.S. Application Data

(63) Continuation of application No. PCT/US2020/070092, filed on May 29, 2020.
(Continued)

(51) Int. Cl.
*B65G 67/24* (2006.01)
*B65G 43/10* (2006.01)

(52) U.S. Cl.
CPC ............ *B65G 67/24* (2013.01); *B65G 43/10* (2013.01)

(58) Field of Classification Search
CPC ........ B25J 9/0093; B65G 67/08; B65G 21/14; B65G 59/02; B65G 61/00; B65G 67/02;
(Continued)

(56) References Cited

U.S. PATENT DOCUMENTS

| 307,980 A | 11/1884 | Paxton |
| 2,563,965 A | 8/1951 | Seed |

(Continued)

FOREIGN PATENT DOCUMENTS

| DE | 102014116725 A1 | 5/2016 |
| EP | 2 570 372 A1 | 3/2013 |

(Continued)

OTHER PUBLICATIONS

International Patent Application PCT/US2020/070092 International Search Report dated Sep. 18, 2020. 5 pages.
(Continued)

*Primary Examiner* — Gregory W Adams
(74) *Attorney, Agent, or Firm* — Woodard, Emhardt, Henry, Reeves & Wagner LLP

(57) ABSTRACT

A system includes a robot configured to load and/or unload from a location, such as a cargo carrier or building. The robot includes a base unit that has a transport system to move the base unit. A mast extends from the base unit, and the mast has a mast conveyor. The mast is configured to extend and retract. An End of Arm Tool (EoAT) is coupled to the mast in a rotatable manner. The EoAT includes an EoAT conveyor configured to move a cargo item to and from the mast conveyor. A gripper mechanism is configured to move between a retracted position where the gripper mechanism is clear of the cargo item on the EoAT conveyor and an extended position where the gripper mechanism is able to grip the cargo item.

30 Claims, 30 Drawing Sheets

Related U.S. Application Data

(60) Provisional application No. 62/855,142, filed on May 31, 2019.

(58) Field of Classification Search
CPC ........ B65G 67/24; B65G 43/10; B65G 67/10; B65G 67/04; B65G 67/06; B65G 67/12; B65G 67/14; B65G 67/16; B65G 67/18; B65G 67/20; B65G 67/22; B60B 19/003
See application file for complete search history.

(56) References Cited

U.S. PATENT DOCUMENTS

| | | | |
|---|---|---|---|
| 2,613,800 A * | 10/1952 | Merck | E21D 9/128 198/733 |
| 2,755,945 A | 7/1956 | Gilson | |
| 2,973,073 A | 2/1961 | Elliott | |
| 3,158,252 A | 11/1964 | Vogt | |
| 3,356,236 A | 12/1967 | Shaw et al. | |
| 3,885,682 A | 5/1975 | McWilliams | |
| 3,931,897 A | 1/1976 | Bacon et al. | |
| 5,009,560 A | 4/1991 | Ruder et al. | |
| 5,015,145 A | 5/1991 | Angell et al. | |
| 5,176,485 A | 1/1993 | Ruder et al. | |
| 5,391,038 A | 2/1995 | Stewart | |
| 5,403,142 A | 4/1995 | Stewart | |
| 5,538,391 A | 7/1996 | Bonnet | |
| 5,794,416 A | 8/1998 | Rahman | |
| 6,431,346 B1 * | 8/2002 | Gilmore | B65G 67/08 198/588 |
| 6,481,563 B1 * | 11/2002 | Gilmore | B65G 67/08 198/588 |
| 7,370,753 B2 * | 5/2008 | Yang | B65G 67/08 198/588 |
| 7,967,543 B2 | 6/2011 | Criswell et al. | |
| 8,172,071 B2 | 5/2012 | Schaefer | |
| 8,562,277 B2 | 10/2013 | Criswell | |
| 8,944,239 B2 * | 2/2015 | Campbell | B65G 41/002 198/588 |
| 9,493,316 B2 * | 11/2016 | Girtman | B65G 67/24 |
| 9,650,215 B2 * | 5/2017 | Girtman | B65G 67/24 |
| 9,725,257 B2 | 8/2017 | Schenning | |
| 2004/0179924 A1 * | 9/2004 | Lundahl | B65G 59/02 414/416.01 |
| 2006/0088403 A1 | 4/2006 | Smith et al. | |
| 2008/0118337 A1 | 5/2008 | Vestergaard | |
| 2009/0067953 A1 | 3/2009 | Schenning | |
| 2009/0074546 A1 | 3/2009 | Christensen et al. | |
| 2011/0139576 A1 | 6/2011 | Johanssen | |
| 2012/0253507 A1 | 10/2012 | Eldershaw et al. | |
| 2013/0034420 A1 | 2/2013 | Hjomet | |
| 2015/0063973 A1 | 3/2015 | Girtman et al. | |
| 2015/0274447 A1 | 10/2015 | McCollum et al. | |
| 2015/0360882 A1 | 12/2015 | Girtman | |
| 2016/0068357 A1 | 3/2016 | Bastian, II | |
| 2016/0243971 A1 | 8/2016 | Scheer et al. | |
| 2016/0375814 A1 * | 12/2016 | Jochim | B60B 19/003 414/547 |
| 2018/0118476 A1 * | 5/2018 | Bastian, II | B65G 47/914 |
| 2018/0134501 A1 | 5/2018 | Ge et al. | |
| 2020/0377317 A1 * | 12/2020 | Zoghzoghy | B65G 67/08 |

FOREIGN PATENT DOCUMENTS

| | | |
|---|---|---|
| EP | 1 885 636 B1 | 4/2013 |
| WO | 9851598 A1 | 11/1998 |
| WO | 199851598 A1 | 11/1998 |
| WO | 1999/046195 A1 | 9/1999 |
| WO | 2006/117003 A1 | 11/2006 |
| WO | 2006/121329 A1 | 11/2006 |
| WO | 2006117003 A1 | 11/2006 |

OTHER PUBLICATIONS

International Patent Application PCT/US2020/070092 Written Opinion dated Sep. 18, 2020. 8 pages.
PCT, Int. App. No. PCT/US2020/070092 International Search Report, dated Sep. 18, 2020.
PCT, Int. App. No. PCT/US2020/070092 Written Opinion of the International Searching Authority, dated Sep. 18, 2020.
Wynright Corporation. RTU Mixed Case. Feb. 11, 2013. 1 page screenshot of video. [online], [retrieved on Sep. 5, 2014] Retrieved from Vimeo.com using Internet <URL:http://vimeo.com/59409850>.
Wynright Corporation. RTU Window View. Feb. 11, 2013. 1 page screenshot of video. [online], [retrieved on Sep. 5, 2014] Retrieved from Vimeo.com using Internet «URL:http://vimeo.com/59409853>.
Wynright Corporation. RTU Robotic Truck Unloading. Dec. 12, 2012. 1 page screenshot of video. [online], [retrieved on Sep. 5, 2014] Retrieved from Vimeo.com using Internet <URL:http://vimeo.com/55458633>.
Wynright Corporation. RTL—Tire Loading. Dec. 12, 2012. 1 page screenshot of video. [online], [retrieved on Sep. 5, 2014] Retrieved from Vimeo.com using Internet <URL:http://vimeo.com/55457869>.
Wynright Corporation. Fluid Unload RTL Unloading. Jan. 9, 2012. 1 page screenshot of video. [online], [retrieved on Sep. 5, 2014] Retrieved from Vimeo.com using Internet <URL:http://vimeo.com/34806951>.
Wynright Corporation. RTL Robotic Truck Loading. Dec. 12, 2012. 1 page screenshot of video. [online], [retrieved on Sep. 5, 2014] Retrieved from Vimeo.com using Internet <URL:http://vimeo.com/55451735>.
Wynright Corporation. Fluid Load RTL Loading. Jan. 13, 2012. 1 page screenshot of video. [online], [retrieved on Sep. 5, 2014] Retrieved from Vimeo.com using Internet <URL:http://vimeo.com/35019088>.
Wynright Corporation. RTL Mixed Case Simulation. Dec. 12, 2012. 1 page screenshot of video. [online], [retrieved on Sep. 5, 2014] Retrieved from Vimeo.com using Internet <URL:http://vimeo.com/55445160>.
Bastian Solutions. New Concepts—Robotic Trailer Loading. Jul. 6, 2011. 1 page screenshot of video. [online], [retrieved on Sep. 5, 2014] Retrieved from YouTube.com using Internet <URL:https://www.youtube.com/watch?v=H-Hw-9uoE_s>.
Teun. The best way to unload a container . . . Nov. 17, 2009. 1 page screenshot of video. [online], [retrieved on Sep. 5, 2014] Retrieved from YouTube.com using Internet <URL:https://www.youtube.com/watch?v=Mc-IC1yclgU>.
Bastian Solutions. ULTRA: Robotic Truck Loading & Unloading, [retrieved on Aug. 30, 2018]. 1 page. Retrieved from the Internet: <URL: https://www.bastiansolutions.com/solutions/technology/industrial-robotics/industrial-robotic-solutions/mobile-robotics/robotic-truck-unloading-loading>.
Bastian Solutions. Robotic Truck Trailer Case Loader/Unloader. [retrieved on Aug. 30, 2018]. 2 pages. Retrieved from the Internet: <URL:https://www.bastiansolutions.com/docs/default-source/default-document-library/ultra-cutsheet.pdf?sfvrsn=368317f3_2>.
Bastian Solutions. MODEX 2018: One Minute Recap. Apr. 25, 2018. 1 page screenshot of video. [online], [retrieved on Aug. 30, 2018], Retrieved from YouTube.com using Internet <URL: https ://www.youtube.com/watch?v=FrC863wL60Y>.
Bastian Solutions. ULTRA Automated Trailer Loading. Apr. 30, 2018. 1 page screenshot of video. [online], [retrieved on Aug. 30, 2018]. Retrieved from YouTube.com using Internet <URL:https://www.youtube.com/watch?v=kSORcgh9-Qw>.
International Patent Application PCT/US2017/058762 International Preliminary Report on Patentability dated Apr. 30, 2019. 19 pages.
International Patent Application PCT/US2017/058762 Written Opinion dated Feb. 14, 2018. 18 pages.
International Patent Application PCT/US2017/058762 International Search Report dated Feb. 14, 2018. 5 pages.
European Patent Application 17866295.3 Extended European Search Report dated Jun. 29, 2020. 9 pages.

(56) References Cited

OTHER PUBLICATIONS

International Patent Application PCT/US2017/058762 International Preliminary Report on Patentability dated May 9, 2019. 20 pages.

* cited by examiner

AUTOMATED UNLOADING AND LOADING ROBOT SYSTEM WITH TELESCOPING MAST, Z-AXIS CONTROL AND CONVEYOR-NESTING GRIPPER

CROSS-REFERENCE TO RELATED APPLICATIONS

This application is a continuation of International Patent Application Number PCT/US2020/070092, filed May 29, 2020, which is hereby incorporated by reference. International Patent Application Number PCT/US2020/070092, filed May 29, 2020, claims the benefit of US Patent Application No. 62/855,142, filed May 31, 2019, which are hereby incorporated by reference. This application claims the benefit of US Patent Application No. 62/855,142, filed May 31, 2019, which is hereby incorporated by reference.

BACKGROUND

Transporting cargo, such as packages, boxes, bags, cans, and/or other products, to and from cargo containers, such as trailers, cargo carriers, and the like, can be quite expensive, labor-intensive, and even dangerous at times. Often the shipping and receiving operations at the loading docks are the bottlenecks for the entire fulfillment operation. Stacking and unstacking cargo items in warehouses and manufacturing plants can be likewise expensive and dangerous. High stacks of cargo items can become unstable so as to readily fall on those handling the cargo. Manually loading and unloading a trailer can be a tough job because of the environmental conditions inside the trailer. Often forklift trucks have been used to load pallets of items to and from cargo containers and warehouses, but there are a number of limitations on their use. The loading or unloading process typically takes a considerable amount of time because usually only one forklift can fit inside the trailer at a time. In addition, the pallets for the forklifts typically waste usable space within the cargo container and add unnecessary weight. This wasted empty space and added weight costs money. When difficulties arise with the forklifts, loading dock personnel have been used to manually unload and stack items within the cargo space, but again such labor intensive activities can still be quite expensive and time consuming as well as can result in injury to the personnel. Robotic and other automated systems have been proposed for loading and unloading cargo, but these systems still have a number of significant drawbacks. The throughput provided by these systems is typically low, and these systems are error prone, thereby still requiring human intervention when mishaps occur.

Thus, there is a need for improvement in this field.

SUMMARY

An automated unloading and loading robot system has been developed to rapidly stack and/or unstack cargo items in a cargo carrier (or other location). An earlier version of the robot system is described in US Publication No. 2018/0118476 A1 to Bastian II et al., published on May 3, 2018 (US patent application Ser. No. 15/795,947, filed Oct. 27, 2017) which is hereby incorporated by reference in its entirety. Several unique improvements to that system have been developed to address a number of issues. The system includes a mobile robot that has a unique End of Arm Tool (EoAT) attached to a moveable mast. The EoAT incorporates a conveyor system that is able to rapidly transport the cargo items on a near continuous basis. The EoAT includes an extendable-retractable gripper mechanism that is configured to grip the cargo items. In one form, the gripper mechanism includes one or more vacuum cups to grip the cargo items. The gripper mechanism is able to extend the vacuum cups above the conveyor system on the EoAT in order to pull cargo onto the conveyor system. Once the cargo item is pulled onto the conveyor system, the vacuum cups are retracted below the conveyor system so that the cargo item is able to travel over the gripper mechanism. When unloading or stacking the cargo items, the gripper mechanism can operate in a reverse fashion and accurately push the cargo items from the conveyor system and onto the cargo stack. The EoAT is able to move in yaw (side-to-side) and pitch (tilt) directions relative to the mast so that it is properly positioned to pick or place the cargo items. Some cargo items, such as boxes, can tip over so as to not be level. The EoAT has been further configured to twist or roll so that the EoAT is able to handle and move any tilted cargo items. Moreover, the EoAT now includes several unique guiding structures that enhance the ability of the EoAT to load and unload cargo items. The mast is attached to a mobile base unit. The mobile base unit is able to move the EoAT by moving the mast. In addition, large or major movements of the EoAT can be accomplished by moving and/or steering the mobile base unit. For example, the mobile base unit is configured to move in and out of a trailer as well as in side-to-side directions. The moveable mast minimizes the distance the base unit needs to move in order to load or unload the cargo items from the cargo container. The base unit is able to adjust the yaw and pitch of the mast. The base unit is also able to extend and retract the mast so that the base unit does not need to move as the EoAT moves vertically and horizontally along a row of stacked cargo items. The mast and base unit have conveyors for transporting the cargo items to and from the EoAT. In one form, an extendable conveyor is coupled to the base unit so as to form a link between the robot and main conveyor system in a facility. The mast is also internally extendable or retractable so that the length of the mast is able to be adjusted and still be able to transport cargo items. This ability to further retract the mast allows the robot to move in tight spaces such as in between support columns. This robot system can rapidly load and unload cargo carriers automatically with no or little human interaction. This system design eliminates the need for forklift operators which in turn reduces the risk of injury and expense associated with the operators as well as reduces loading and unloading times.

Aspect 1 generally concerns a system that includes a robot that has an End of Arm Tool (EoAT) mounted to a mast with a continuous conveyor path.

Aspect 2 generally concerns the system of aspect 1 in which the mast is coupled to a base unit with one or more omnidirectional wheels.

Aspect 3 generally concerns the system of aspect 2 in which the mast has a bridge conveyor that is extendable and retractable.

Aspect 4 generally concerns the system of aspect 3 in which the bridge conveyor extends across at least two mast sections that move in a telescoping manner.

Aspect 5 generally concerns the system of aspect 4 in which the bridge conveyor includes a conveyor belt that is routed in an S-shaped pattern between the sections.

Aspect 6 generally concerns the system of aspect 4 in which the mast has a drive system to move the sections relative to one another.

Aspect 7 generally concerns the system of aspect 1 in which the mast includes at least two conveyor sections for buffering cargo.

Aspect 8 generally concerns the system of aspect 7 in which the conveyors sections include belt conveyors that extend substantially across the full width of the mast.

Aspect 9 generally concerns the system of aspect 1 in which the mast includes one or more transition conveyors to transport cargo between the mast and EoAT.

Aspect 10 generally concerns the system of aspect 1 in which the EoAT includes a roll drive configured to rotate the EoAT relative to the mast.

Aspect 11 generally concerns the system of aspect 10 in which the EoAT includes an actuator gearbox configured to move the EoAT in yaw and pitch directions.

Aspect 12 generally concerns the system of aspect 1 in which the EoAT includes at least one conveyor to transport cargo.

Aspect 13 generally concerns the system of aspect 12 in which the EoAT includes a gripper mechanism with a gripper member that spans across the conveyor.

Aspect 14 generally concerns the system of aspect 13 in which the gripper mechanism has one or more vacuum cups to grip cargo.

Aspect 15 generally concerns the system of aspect 13 in which the gripper mechanism has a carriage with linkage assemblies positioned on opposite sides of the conveyor.

Aspect 16 generally concerns the system of aspect 15 in which the linkage assemblies include cam followers engaging cam rails located on the opposite sides of the conveyor.

Aspect 17 generally concerns the system of aspect 16 in which the cam followers each include at least a pair of cam rollers disposed on opposite sides of the cam rails.

Aspect 18 generally concerns the system of aspect 1 in which the EoAT includes at least two conveyor sections for transporting cargo.

Aspect 19 generally concerns the system of aspect 18 in which the EoAT includes a gripper mechanism configured to nest in a retracted position between the conveyor sections.

Aspect 20 generally concerns the system of aspect 1 in which the EoAT includes a location member with a probe member extending from a distal end of the EoAT.

Aspect 21 generally concerns the system of aspect 20 in which the EoAT includes a shoehorn member configured to guide cargo against the location member.

Aspect 22 generally concerns the system of aspect 21 in which the shoehorn member includes a fan section that is angled towards the location member.

Aspect 23 generally concerns the system of aspect 20 in which the EoAT include a rocker arm dangling below the probe member.

Aspect 24 generally concerns the system of aspect 23 in which the rocker arm is angled at an acute angle relative to the probe member.

Aspect 25 generally concerns the system of aspect 24 in which the rocker arm is pivotally connected to the EoAT via a pivot connector.

Aspect 26 generally concerns the system of aspect 25 in which the EoAT has a stop member that holds the rocker arm in position.

Aspect 27 generally concerns the system of aspect 23 in which the rocker arm is flexible.

Aspect 28 generally concerns the system of any previous aspect in which the mast is coupled to a base unit with one or more omnidirectional wheels.

Aspect 29 generally concerns the system of any previous aspect in which the mast has a bridge conveyor that is extendable and retractable.

Aspect 30 generally concerns the system of any previous aspect in which the bridge conveyor extends across at least two mast sections that move in a telescoping manner.

Aspect 31 generally concerns the system of any previous aspect in which the bridge conveyor includes a conveyor belt that is routed in an S-shaped pattern between the sections.

Aspect 32 generally concerns the system of any previous aspect in which the mast has a drive system to move the sections relative to one another.

Aspect 33 generally concerns the system of any previous aspect in which the mast includes at least two conveyor sections for buffering cargo.

Aspect 34 generally concerns the system of any previous aspect in which the conveyors sections include belt conveyors that extend substantially across the full width of the mast.

Aspect 35 generally concerns the system of any previous aspect in which the mast includes one or more transition conveyors to transport cargo between the mast and EoAT.

Aspect 36 generally concerns the system of any previous aspect in which the EoAT includes a roll drive configured to rotate the EoAT relative to the mast.

Aspect 37 generally concerns the system of any previous aspect in which the EoAT includes an actuator gearbox configured to move the EoAT in yaw and pitch directions.

Aspect 38 generally concerns the system of any previous aspect in which the EoAT includes at least one conveyor to transport cargo.

Aspect 39 generally concerns the system of any previous aspect in which the EoAT includes a gripper mechanism with a gripper member that spans across the conveyor.

Aspect 40 generally concerns the system of any previous aspect in which the gripper mechanism has one or more vacuum cups to grip cargo.

Aspect 41 generally concerns the system of any previous aspect in which the gripper mechanism has a carriage with linkage assemblies positioned on opposite sides of the conveyor.

Aspect 42 generally concerns the system of any previous aspect in which the linkage assemblies include cam followers engaging cam rails located on the opposite sides of the conveyor.

Aspect 43 generally concerns the system of any previous aspect in which the cam followers each include at least a pair of cam rollers disposed on opposite sides of the cam rails.

Aspect 44 generally concerns the system of any previous aspect in which the EoAT includes at least two conveyor sections for transporting cargo.

Aspect 45 generally concerns the system of any previous aspect in which the EoAT includes a gripper mechanism configured to nest in a retracted position between the conveyor sections.

Aspect 46 generally concerns the system of any previous aspect in which the EoAT includes a location member with a probe member extending from a distal end of the EoAT.

Aspect 47 generally concerns the system of any previous aspect in which the EoAT includes a shoehorn member configured to guide cargo against the location member.

Aspect 48 generally concerns the system of any previous aspect in which the shoehorn member includes a fan section that is angled towards the location member.

Aspect 49 generally concerns the system of any previous aspect in which the EoAT include a rocker arm dangling below the probe member.

Aspect 50 generally concerns the system of any previous aspect in which the rocker arm is angled at an acute angle relative to the probe member.

Aspect 51 generally concerns the system of any previous aspect in which the rocker arm is pivotally connected to the EoAT via a pivot connector.

Aspect 52 generally concerns the system of any previous aspect in which the EoAT has a stop member that holds the rocker arm in position.

Aspect 53 generally concerns the system of any previous aspect in which the rocker arm is flexible.

Aspect 54 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
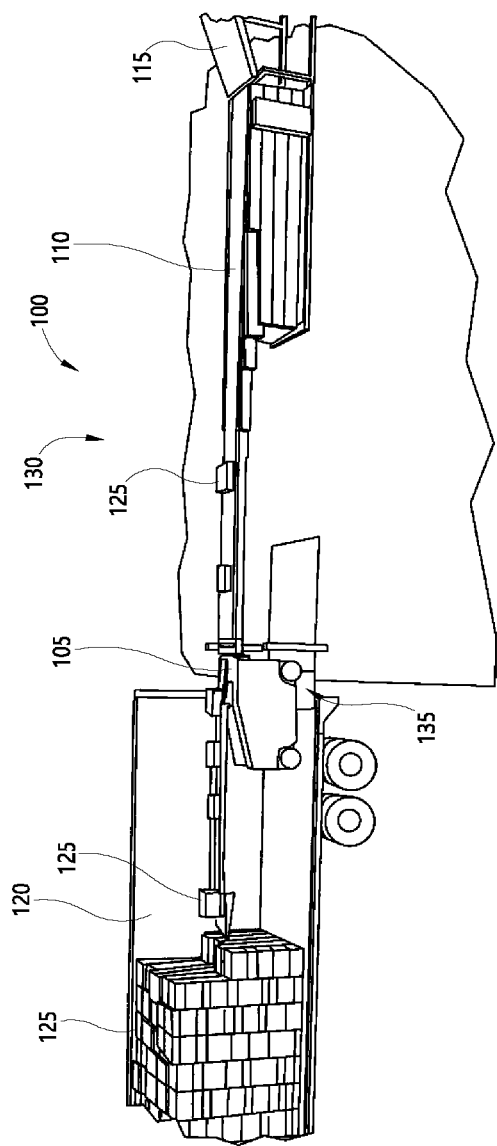
FIG. 1 is a perspective view of a robotic system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a perspective view of a robotic system 100 according to one example. The robotic system 100 includes a robot 105 and an extendable conveyor 110 operatively positioned between the robot 105 and a main conveyer system 115, which is typically (but not always) found in a warehouse and/or manufacturing plant. As shown, the robot 105 is configured to move in and out of a cargo carrier 120, such as a semi-trailer or flatbed trailer, in a progressive manner. Alternatively or additionally, the robot 105 is able to move between various dock doors as well as other cargo carriers 120. As the robot 105 progressively moves in and out of the cargo carrier 120, the extendable conveyor 110 extends or retracts, depending on the movement of the robot 105 in the cargo carrier 120 as well as elsewhere. The extendable conveyor 110 can for example include connectors, cabling, and/or tubing for supplying electrical power, air, and/or communication pathways to the robot 105. The robot 105 is configured to load and/or unload cargo 125 from the cargo carrier 120. In the illustrated example, the cargo 125 is in the form of boxes, but in other examples, other types of cargo 125, such as bags, drums, cases, etc., can be loaded and/or unloaded from the cargo carrier 120 with the robot 105. As will be explained in greater detail below, the robot 105 is configured to load and/or unload the cargo 125 within the cargo carrier 120 in a continuous or near continuous fashion. As a result, the robot 105 is able to quickly service the cargo carrier 120. The robot 105 is designed to rapidly stack and unstack the cargo 125 within the cargo carrier 120 as well as unstack or unload the cargo 125 from the cargo carrier 120 with minimal movement. Consequently, the cargo carrier 120 can be rapidly loaded and unloaded automatically without any (or minimal) human interaction. As can be also seen in FIG. 1, the robot 105 is able to pack or unpack the cargo 125 from the bottom and nearly to the top and sides of the cargo carrier 120 so as to efficiently almost fill the entire space inside the cargo carrier 120, if needed.

To provide some context, the robotic system 100 will be described with reference to a warehousing environment, but it should be recognized that the robotic system 100 can be used in other types of environments, such as manufacturing plants, food processing plants, and/or agricultural environments, to name just a few examples. Besides on or inside the cargo carrier 120, the robot 105 can be used to stack or unstack cargo 125 at other locations, such as at various storage or staging locations within a building 130. As illustrated, the extendable conveyor 110 and the main conveyer system 115 are typically located within the building 130, such as a warehouse. The extendable conveyor 110 transports the cargo 125 between the robot 105 and the main conveyer system 115, and vice versa. The main conveyer system 115 for instance can supply the cargo 125 to various processing equipment and/or storage locations within the building 130. The robot 105 is able to service the cargo carrier 120 through a loading dock 135 in the building 130 such that no modifications to the loading dock 135 and/or building 130 are typically required.

Figure 2:
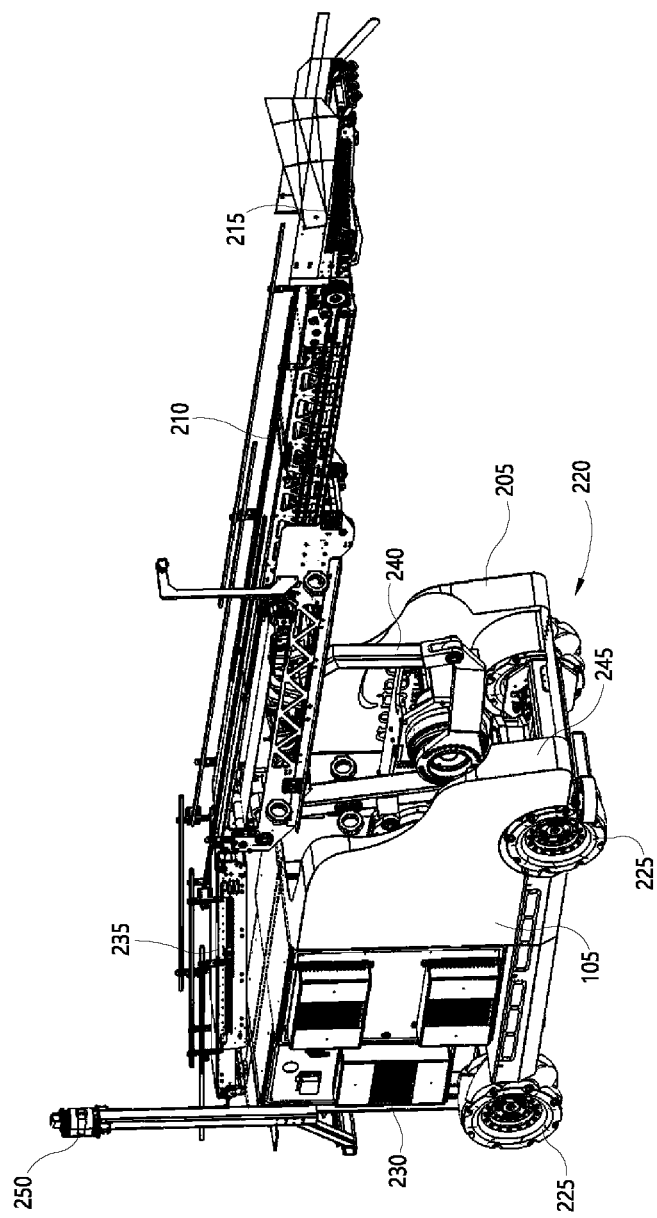
FIG. 2 is a front perspective view of a robot used in the FIG. 1 robotic system.
Figure 3:
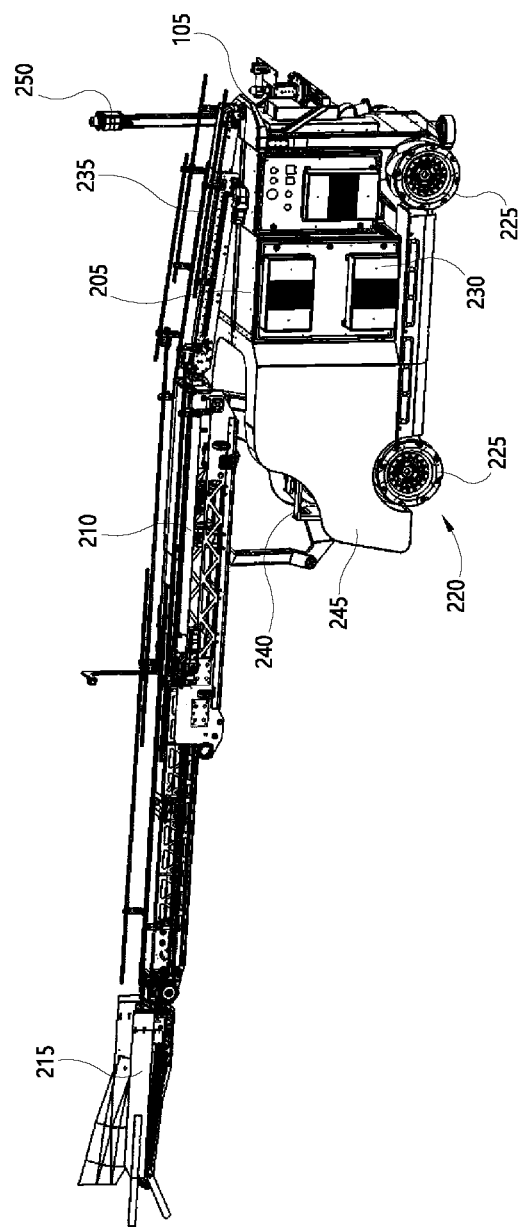
FIG. 3 is a side perspective view of the FIG. 2 robot.

FIGS. 2 and 3 respectively show front and rear perspective views of the robot 105. As can be seen, the robot 105 includes a base unit 205, a mast 210 extending from the base unit 205, and an End of Arm Tool ("EoAT") 215 extending from the mast 210. To move and manipulate the EoAT 215, the robot 105 has a series of joints (i.e., J1, J2, J3, J4, and J5) that provide a number of degrees of freedom of movement. The base unit 205 is generally configured to provide power, move, and control the general operation of the robot 105. The mast 210 is designed to position the EoAT 215 as well as provide a pathway for conveying the cargo 125 between the base unit 205 and the EoAT 215. The EoAT 215 is configured to rapidly stack and unstack the cargo 125 in the cargo carrier 120. The EoAT 215 has a low profile to make picking or placing cargo 125 from the floor of the cargo carrier 120 or building 130 easier as well as in stacks of cargo 125. The EoAT 215 is shaped so that the cargo 125 only needs to be lifted 2 to 3 inches (about 5-8 cm) from the floor to be placed on the EoAT 215, but in other examples, the cargo 125 can be lifted to lower or higher heights from the floor. For instance, the EoAT 215 in other examples can include a heavy duty version that is larger for lifting larger and/or heavier cargo 125. This also allows cargo 125 to be packed close to the top of the cargo carrier 120. In one example, the cargo 125 only leaves a 7 inch (about 18 cm) empty gap at the top of the cargo carrier 120. The robot 105 is configured to load and unload the cargo 125 using a serpentine pattern at a high rate. In one form, the robot 105 is able to stack or unstack the cargo 125 at an average rate of no more than one (1) item per every three (3) seconds.

As shown, the base unit 205 includes a transport system 220 that is configured to move the robot 105. The transport system 220 in the depicted example includes one or more wheels 225 that move the base unit 205. The cargo carrier 120 typically provides limited space in which the robot 105 is able to maneuver. The transport system 220 is configured to enhance the mobility of the base unit 205 so that the robot 105 is able to maneuver within the tight confines of the cargo carrier 120. In one form, the wheels 225 include omnidirectional wheels that not only move the base unit 205 in a longitudinal direction (i.e., back and forth), but also in a lateral direction (i.e., side to side). As will be explained in greater detail below, the mast 210 is retractable and extendable to facilitate ease of lateral movement of the robot 105 within the building 130 as well as elsewhere. The base unit 205 along with the rest of the robot 105 can be powered in any number of manners. In the illustrated example, the robot 105 is electrically powered by an external power source (e.g., power cable with a plug), but in other examples, the robot 105 can be self powered and/or powered in other ways, such as through batteries, solar cells, pneumatically through pneumatic tanks, hydraulically through hydraulic lines, and the like. The base unit 205 further has at least one controller 230 for controlling the operation of the robot 105 along with a mast actuator 240 that is configured to move the mast 210. In one form, the controller 230 includes one or more Programmable Logic Controllers (PLCs). The base unit 205 can include other components to enhance safety, such as lighting, safety scanners, as well as safety electronic (E) stop radiofrequency (RF) receivers. The base unit 205 also serves as a weighted counter balance to counterbalance the weight of the mast 210 and EoAT 215 as well any cargo 125 thereon.

At least one base unit conveyor 235, which is located on the top of the base unit 205, conveys the cargo 125 between the mast 210 and the extendable conveyor 110. The base unit conveyor 235 is able to extend and retract in a fashion similar to the mast 210. This configuration provides stable support as the cargo 125 transitions between the mast 210 and the extendable conveyor 110. The base unit 205 further includes a base unit housing 245 that covers and protects the various components of the base unit 205. The base unit 205 further includes one or more safety sensors 250 that senses objects, individuals, and/or structures located around the robot 105. In one example, the sensors 250 are in the form of light curtains for sensing the relative location of the robot 105. For instance, the sensors 250 can sense when personnel get too close to the robot 105 such that operation of the robot 105 can cease or enter a safe operational mode. The sensors 250 can also sense the walls of the cargo carrier 120 so that the robot 105 is properly positioned within the cargo carrier 120.

Figure 4:
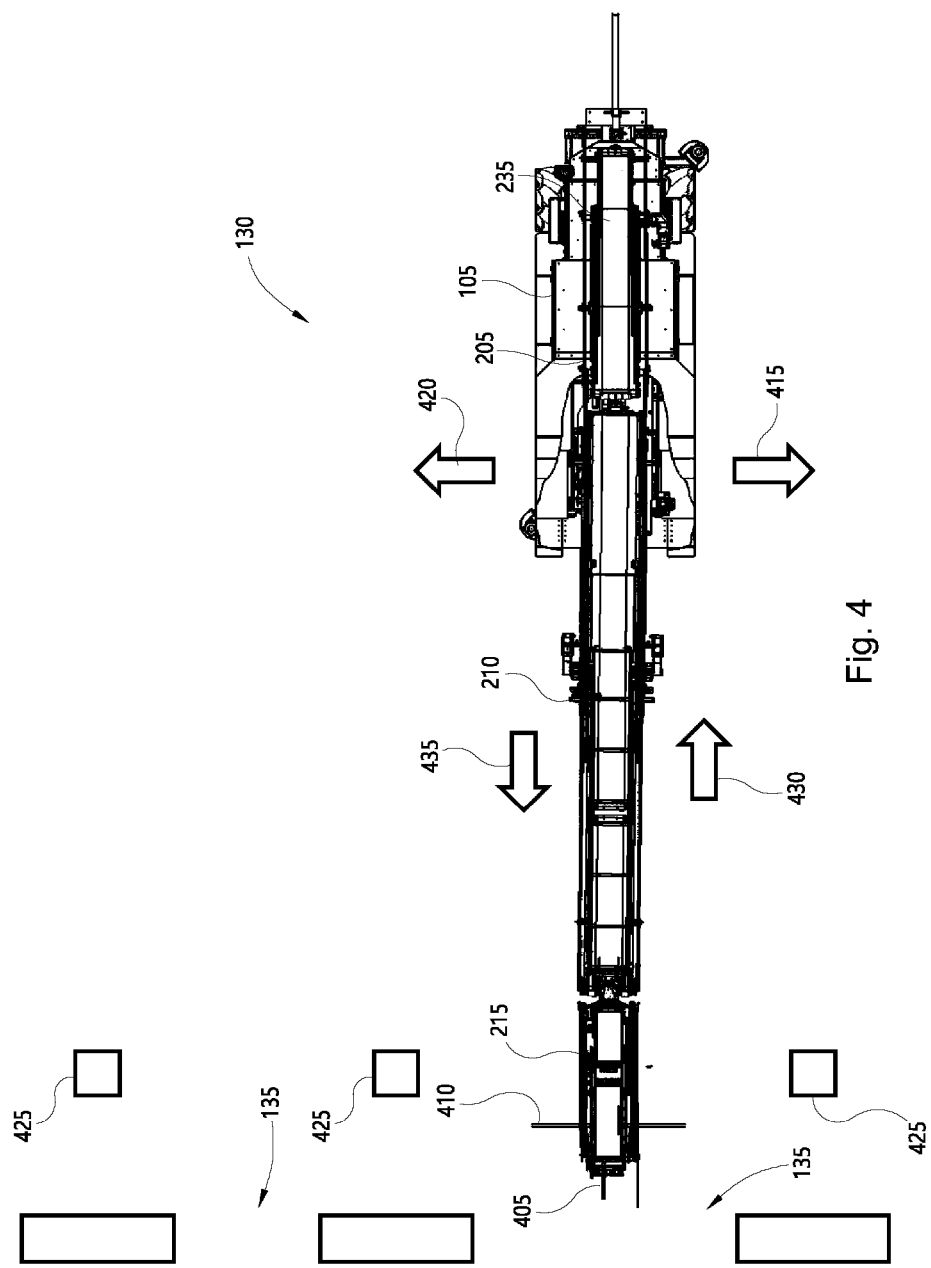
FIG. 4 is a top view of the FIG. 1 robotic system.

FIG. 4 shows a top view of the robot 105 positioned in the building 130. As can be seen, the building 130 in this example includes two or more loading docks 135. The robot 105 includes a longitudinal axis 405 that extends generally along the length of the robot 105 from the base unit 205, mast 210, and EoAT 215. The robot 105 further includes a lateral axis 410 that extends transverse or perpendicular to the longitudinal axis 405. As noted before, the wheels 225 of the transport system 220 are configured to move the robot 105 in a first lateral direction 415 (e.g., left direction) and an opposite second lateral direction 420 (e.g., right direction). By being able to move along the lateral axis 410 in the first lateral direction 415 or second lateral direction 420, the robot 105 is able to quickly move between the loading docks 135. Typically, buildings 130 include one or more columns 425 for supporting the roof of the building 130 or other structures. As can be seen, the columns 425 as well as other objects within the building 130 can interfere with the lateral movement of the robot 105. While the wheels 225 allow the entire robot 105 to move forwards and backwards along the longitudinal axis 405 within the building 130 to move or weave around the columns 425, cargo 125, and/or other objects within the building 130, this movement can be difficult and time consuming. To facilitate lateral movement, the mast 210 is able to shrink by retracting in a retracted direction 430 along the longitudinal axis 405. During retraction of the mast 210, the EoAT 215 moves closer towards the base unit 205. Once the EoAT 215 clears the columns 425 or other obstruction when the base unit 205 of the robot 105 moves laterally, the mast 210 is able to once again expand by extending in an extended direction 435. The robot 105 is then able to service (i.e., load or unload) the cargo carrier 120 at the next loading dock 135.

Some cargo carriers 120 can have different lengths. Depending on the amount of cargo 125 occupying the cargo carrier 120 at a particular time during loading or unloading, the effective available space within the cargo carrier 120 can vary. The mast 210 is able to partially extend or retract and still transport cargo 125 along the mast 210. With this ability to extend and retract the EoAT 215 via the mast 210, the robot 105 is able to more readily handle the cargo carriers 120 with different lengths or effective open spaces. In other words, the length of the mast 210 can adapt to different situations. In some situations, the cargo carrier 120 may not be able to safely handle the full weight of the robot 105. With the mast 210 being able to extend in the extended direction 435, the base unit 205 can remain outside the cargo carrier 120 such that the robot 105 is able to load and unload cargo 125 with the base unit 205 located inside the building 130. In other cases, the base unit 205 can span across the loading dock 135 so that the weight of the base unit 205 is partially supported by both the cargo carrier 120 and the building 130. In other use cases, the base unit 205 can travel fully inside the cargo carrier 120 such that the entire weight of the robot 105 is supported by the cargo carrier 120. In such use cases, the mast 210 can be shrunk or retracted depending on the available space inside the cargo carrier 120.

Figure 5:
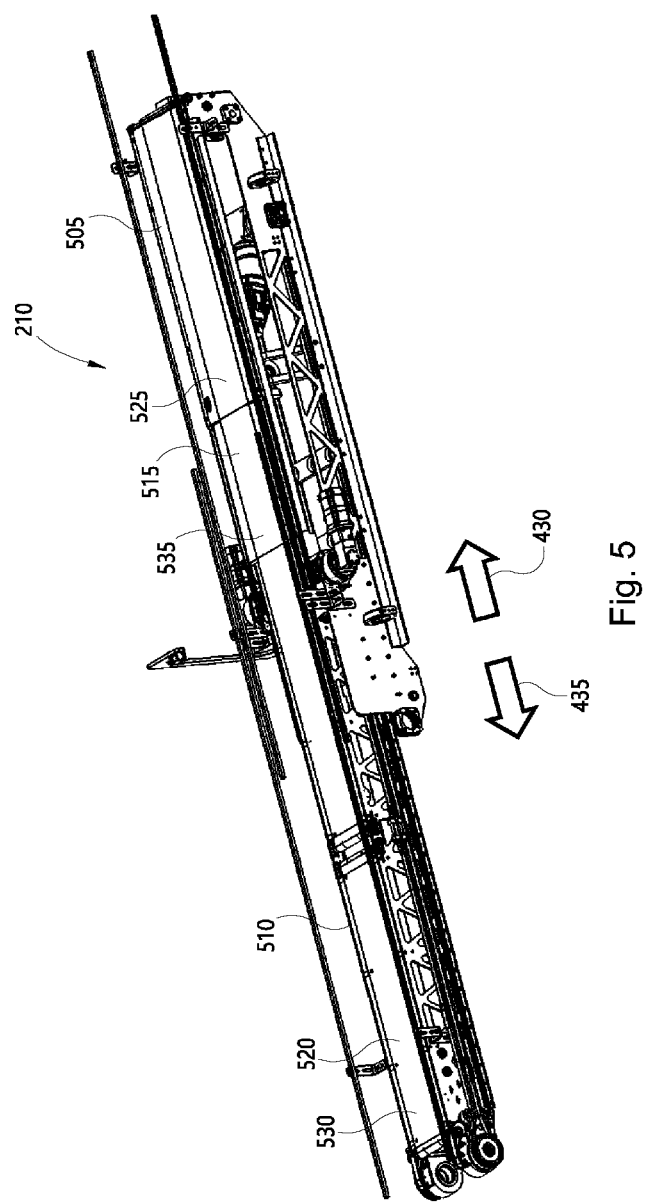
FIG. 5 is a perspective view of a mast used in the FIG. 2 robot.
Figure 6:
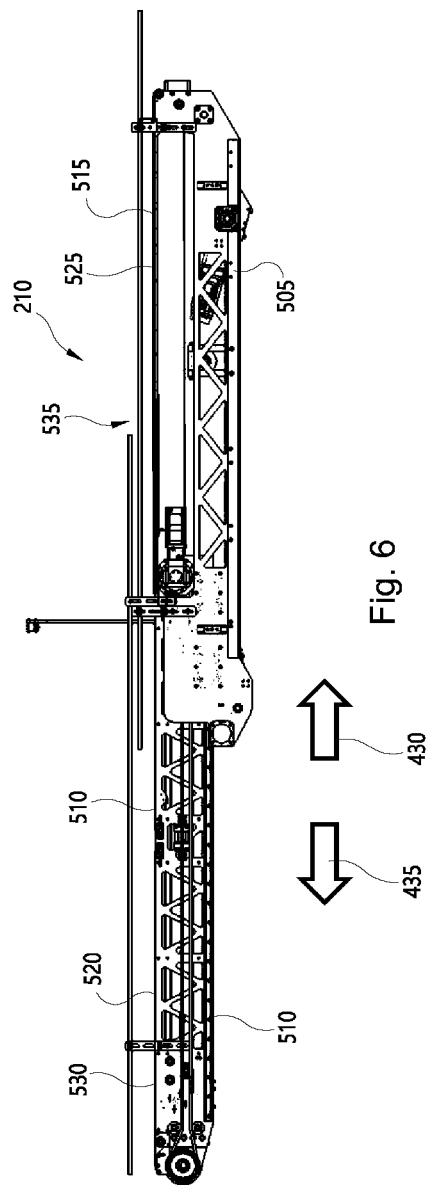
FIG. 6 is a first side view of the FIG. 5 mast.

Turning to FIGS. 5 and 6, the mast 210 includes a base mast section 505 that is coupled to the base unit 205 and an EoAT mast section 510 that is configured to move in a telescoping manner relative to the base mast section 505 in the retracted direction 430 and the extended direction 435. Opposite the base mast section 505, the EoAT mast section 510 is coupled to the EoAT 215. In one form, the EoAT mast section 510 is received inside the base mast section 505 in a telescoping manner such that the EoAT mast section 510 forms an inner mast section and the base mast section 505 forms an outer mast section. The base mast section 505 in other forms can be received inside the EoAT mast section 510 in a telescoping or other manner. At least one bridge conveyor 515 spans across the base mast section 505 and the EoAT mast section 510. The EoAT mast section 510 has a buffer conveyor 520 that is configured to buffer cargo 125 to or from the EoAT 215. In the illustrated example, both the bridge conveyor 515 and buffer conveyor 520 are belt type conveyors, but different types and/or combinations of conveyors can be used in other examples. The bridge conveyor 515 includes a bridge conveyor belt 525, and the buffer conveyor 520 includes a buffer conveyor belt 530. The bridge conveyor belt 525 is routed to loop between the base mast section 505 and the EoAT mast section 510. The bridge conveyor 515 has a bridge conveyor bed 535 upon which the cargo 125 is transported. While being transported on the bridge conveyor bed 535, the cargo 125 rests or slides relative to the bridge conveyor belt 525. The bridge conveyor 515 is configured so that the bridge conveyor bed 535 is able to become shorter or longer as the EoAT mast section 510 moves in the retracted direction 430 or the extended direction 435. When the EoAT mast section 510 extends or retracts, the bridge conveyor bed 535 of the bridge conveyor 515 is still able to move the cargo 125.

Figure 7:
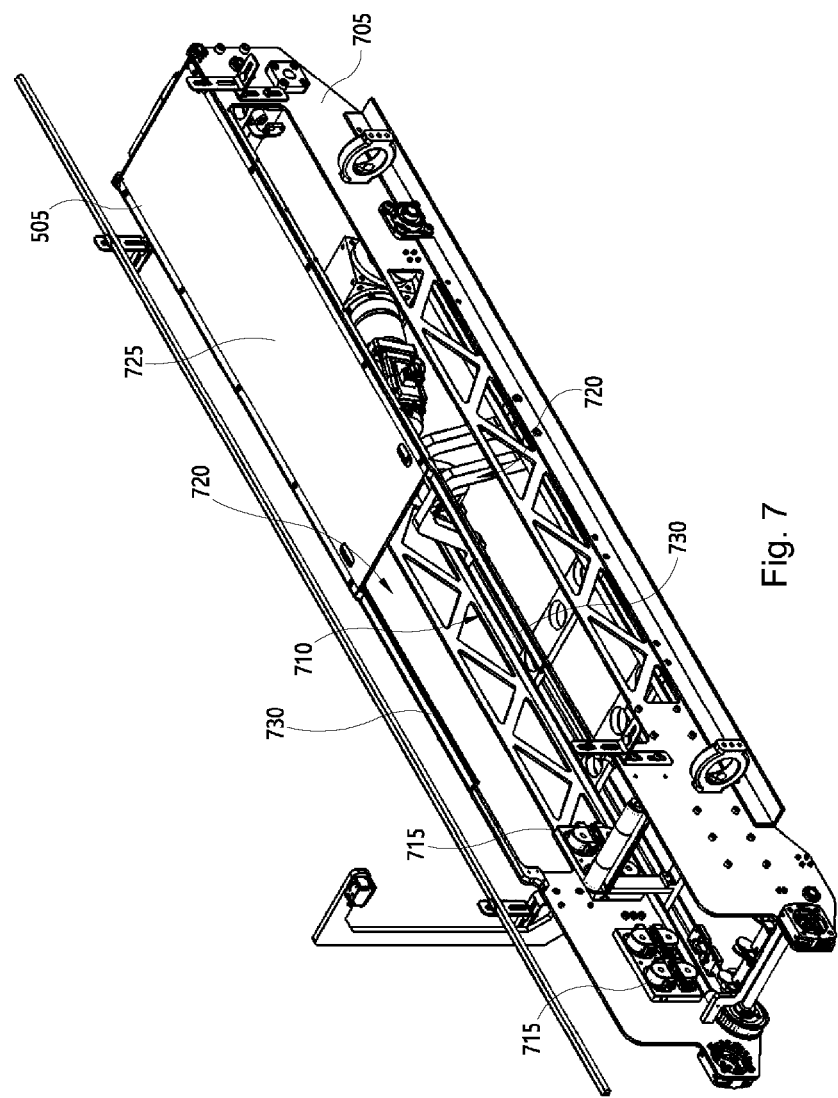
FIG. 7 is a perspective view of a base mast section used in the FIG. 5 mast.
Figure 8:
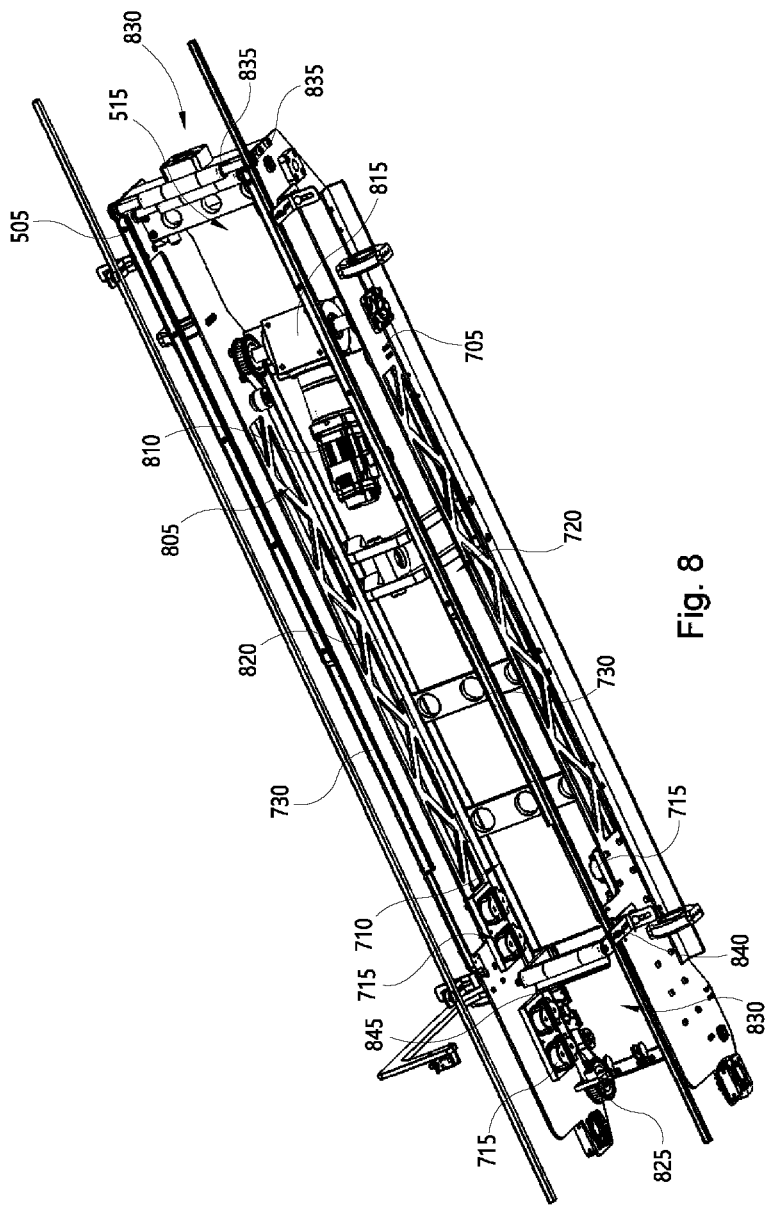
FIG. 8 is an enlarged perspective view of the FIG. 7 base mast section with selected components removed.
Figure 9:
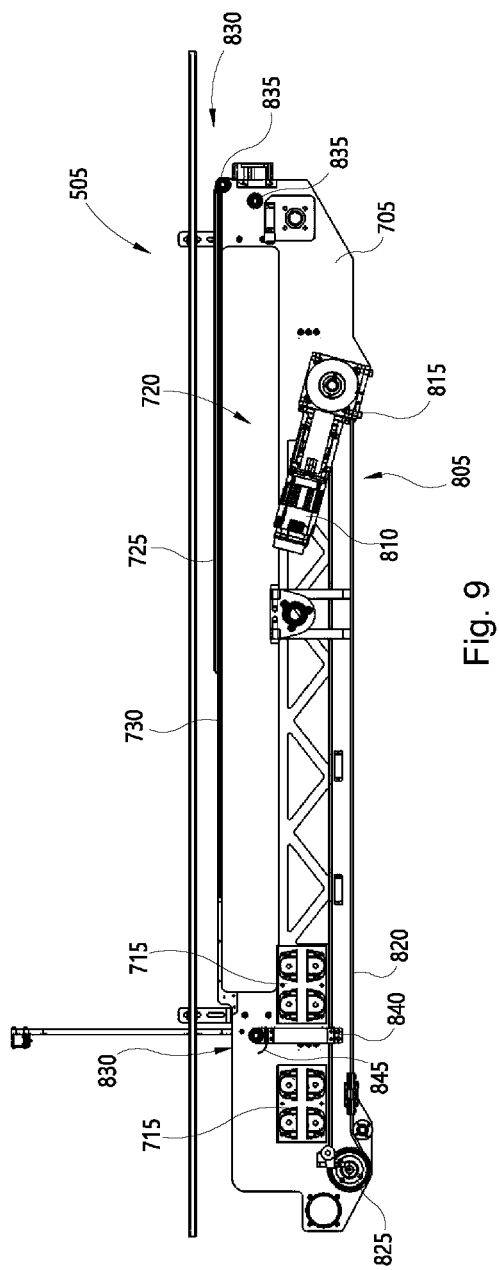
FIG. 9 is a partial cross-sectional view of the FIG. 7 base mast section.

Referring to FIGS. 7, 8, and 9, the base mast section 505 includes a frame 705 that defines a mast section cavity 710 in which the EoAT mast section 510 is slidably received. Proximal to the EoAT mast section 510, the base mast section 505 has one or more rail bearings 715 in which rails of the EoAT mast section 510 are slidably received. The rail bearings 715 support the EoAT mast section 510 and allow the EoAT mast section 510 to move relative to the base mast section 505. In the depicted embodiment, the rail bearings 715 are at least attached to the frame 705 on opposing sides of the mast section cavity 710. The rail bearings 715 in one variation include linear bearings, but other types of mechanisms or structures for facilitating smooth relative movement can be used. At opposing sides of the mast section cavity 710, the frame 705 defines one or more EoAT drive motor slots 720 that are configured to receive conveyor motors on the EoAT mast section 510 that power the bridge conveyor belt 525. The EoAT drive motor slots 720 provide relief so as to allow the conveyor motors to slide underneath the bridge conveyor bed 535 as the EoAT mast section 510 extends and retracts. As can be seen, the base mast section 505 further has a base slider bed 725 that extends across the mast section cavity 710 and one or more base support rails 730 that extend into the mast section cavity 710. The base slider bed 725 is attached to the frame 705 and is configured to support the bridge conveyor belt 525 and provide a sliding surface on which the bridge conveyor belt 525 slides. The base support rails 730 provide further support for the bridge conveyor belt 525 at the edges of the bridge conveyor belt 525.

FIG. 8 show a perspective view of the base mast section 505 with the base slider bed 725 and other components removed for clarity, and FIG. 9 shows a cross-sectional view of the base mast section 505. The base mast section 505 includes a drive mechanism 805 configured to extend and retract the EoAT mast section 510 relative to the base mast section 505. The drive mechanism 805 in one form includes a reversible electric motor, but other types of motors can be used. As can be seen, the drive mechanism 805 includes a motor 810 and a gearbox 815 coupled to the motor 810. One or more drive belts 820 are driven by the motor 810 via the gearbox 815. In the illustrated example, the drive belts 820 are positioned along the frame 705 at opposing sides of the mast section cavity 710. The drive belts 820 are looped between the gearbox 815 and one or more driver idler pulleys 825 located at the end of the base mast section 505 where the EoAT mast section 510 is slidingly received in the rail bearings 715. As will be explained in greater detail below, the EoAT mast section 510 is secured to the drive belts 820. The drive mechanism 805 via the gearbox 815 moves the drive belts 820 in the appropriate direction to extend or retract the EoAT mast section 510 relative to the base mast section 505.

For the bridge conveyor 515, the base mast section 505 has one or more bridge guide rollers 830 for guiding the bridge conveyor belt 525 on the base mast section 505. At the end where the base mast section 505 is coupled to the base unit 205, the bridge guide rollers 830 include one or more bridge idler pulleys 835 around which the bridge conveyor belt 525 is looped. In the illustrated example, there are bridge idler pulleys 835, but in other examples, the bridge conveyor 515 can include more or less bridge idler pulleys 835 than is shown. Proximal to the EoAT mast section 510, the bridge guide rollers 830 include at least one bridge take-up pulley 840 around which the bridge conveyor belt 525 is looped. At the bridge take-up pulley 840, the bridge conveyor 515 in the base mast section 505 includes a belt shield 845 that helps to protect and guide the bridge conveyor belt 525. The bridge take-up pulley 840 guides the bridge conveyor belt 525 to compensate for changes in slack of the bridge conveyor belt 525 as the EoAT mast section 510 extends and retracts.

Figure 10:
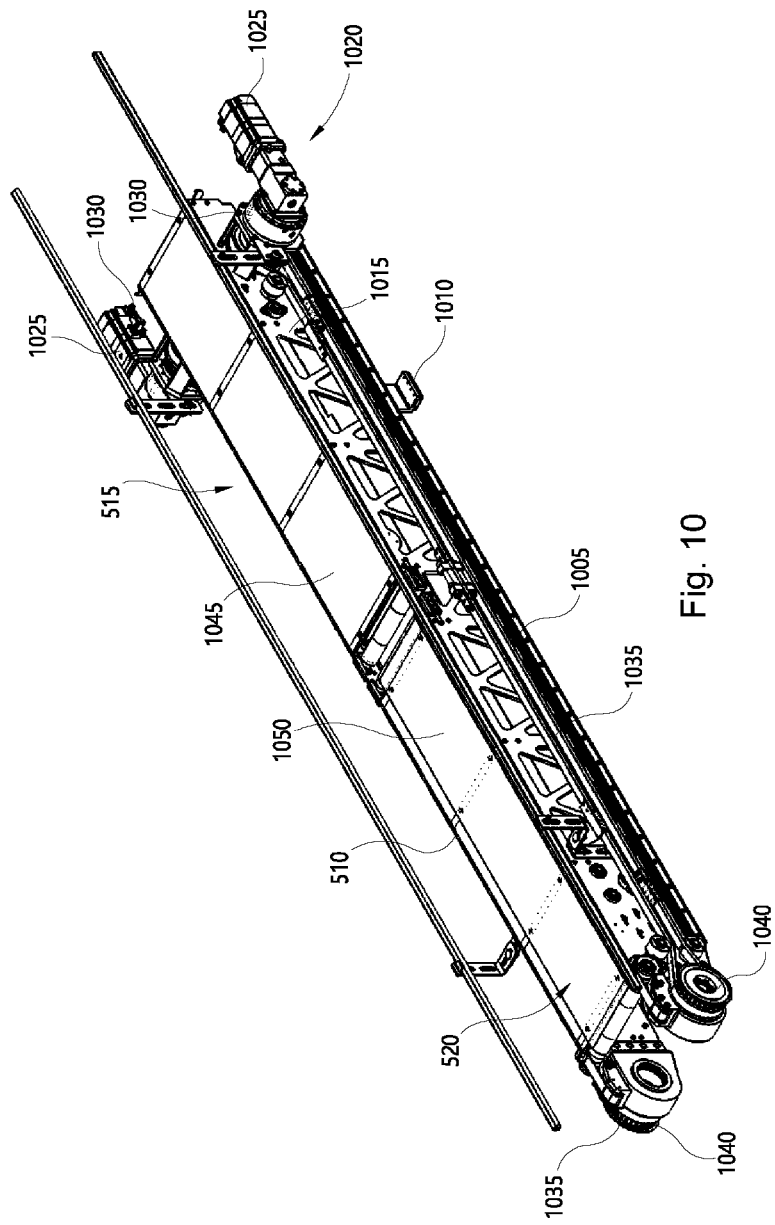
FIG. 10 is a perspective view of an EoAT mast section used in the FIG. 5 mast.
Figure 11:
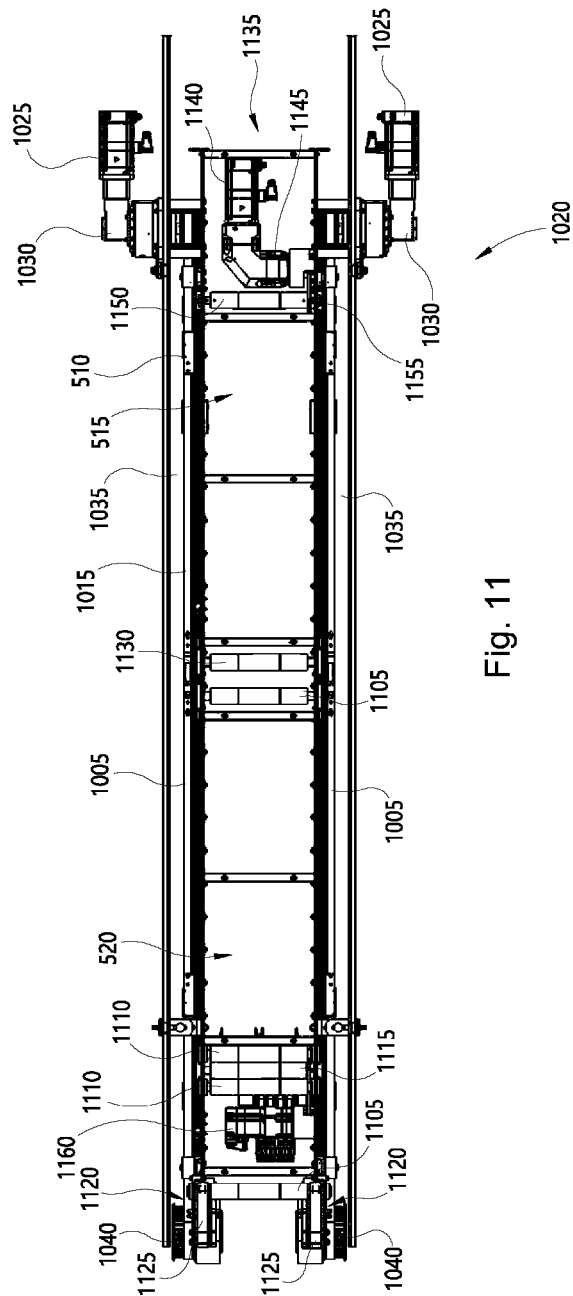
FIG. 11 is a top view of the FIG. 10 EoAT mast section.
Figure 12:
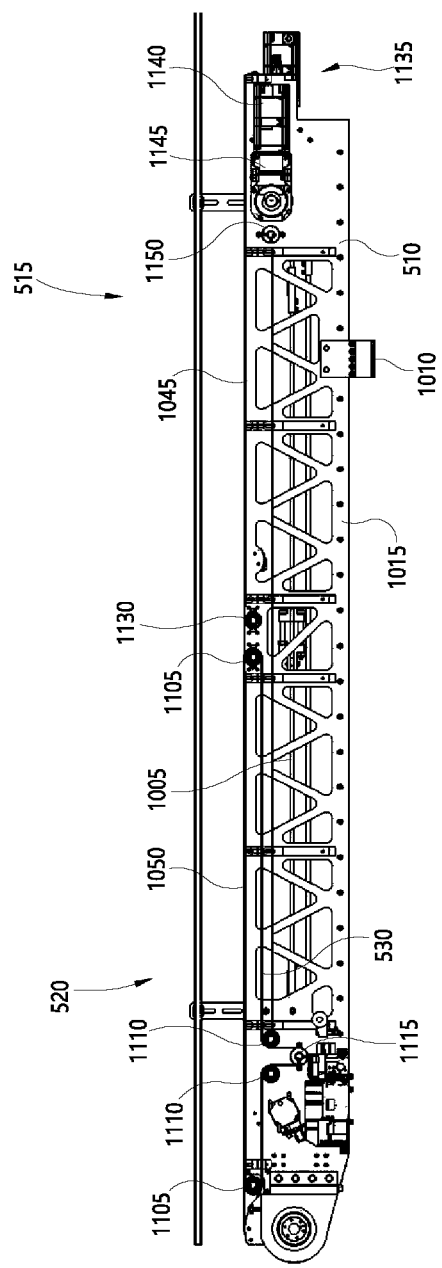
FIG. 12 is a partial cross-sectional view of the FIG. 10 EoAT mast section.

Turning to FIGS. 10, 11, and 12, the EoAT mast section 510 includes one or more bearing rails 1005 that glide in the rail bearings 715 of the base mast section 505. The EoAT mast section 510 further includes one or more drive belt clamps 1010 attached to a frame 1015 of the EoAT mast section 510. The drive belt clamps 1010 clamp to corresponding drive belts 820 of the drive mechanism 805 in the base mast section 505. With the drive belt clamps 1010 clamped to the drive belts 820, the motor 810 of the drive mechanism 805 is able to extend and retract the EoAT mast section 510. In the illustrated example, the EoAT mast section 510 includes two bearing rails 1005 and drive belt clamps 1010 located on opposite sides of the frame 1015. Other examples can have more or less of the bearing rails 1005 and drive belt clamps 1010 shown, and the bearing rails 1005 and drive belt clamps 1010 can be positioned and/or configured differently than is illustrated.

The EoAT mast section 510 further includes an EoAT actuator drive 1020 mounted along the frame 1015. The EoAT actuator drive 1020 is designed to control the pitch and/or tilt of the EoAT 215 relative to the mast 210. As shown, the EoAT actuator drive 1020 includes one or more motors 1025 with one or more gearboxes 1030 that drive one or more EoAT drive belts 1035. The motors 1025 and gearboxes 1030, which tend to be heavy, are positioned proximal to the base mast section 505 in the illustrated example to reduce torque and conserve energy required to move the mast 210. At the end proximal to the EoAT 215, the EoAT actuator drive 1020 has one or more EoAT drive pulleys 1040 around which the EoAT drive belts 1035 are looped. As can be seen, the EoAT drive belts 1035 generally extend the full length of the EoAT mast section 510 between the gearboxes 1030 and the EoAT drive pulleys 1040 of the EoAT actuator drive 1020. Looking back at FIGS. 6 and 7, the motors 1025 and gearboxes 1030 are designed to extend through and move within the EoAT drive motor slots 720 in the frame 705 of the base mast section 505.

As shown in FIG. 10, the bridge conveyor 515 has a bridge slider bed 1045 upon which the bridge conveyor belt 525 slides when moved. The buffer conveyor 520 has a buffer slider bed 1050 upon which the buffer conveyor belt 530 slides when moved. FIG. 11 shows a top view of the EoAT mast section 510 with the bridge slider bed 1045 and buffer slider bed 1050 removed to see other components of the EoAT mast section 510. FIG. 12 shows a cross-sectional view of the EoAT mast section 510. As can be seen, the buffer conveyor 520 has one or more buffer idler pulleys 1105 at opposing ends of the buffer conveyor 520. The buffer conveyor belt 530 is looped around the buffer idler pulleys 1105. The buffer conveyor 520 further has one or more buffer guide pulleys 1110 that direct the buffer conveyor belt 530 around a buffer drive pulley 1115 that moves the buffer conveyor belt 530. At the end proximal the EoAT 215, the EoAT mast section 510 has one or more transition conveyors 1120 with one or more transition conveyor belts 1125. The transition conveyors 1120 aid in transferring the cargo 125 over the EoAT drive pulleys 1040 when moving between the mast 210 and EoAT 215. As shown, the transition conveyor belts 1125 are powered by the buffer idler pulley 1105 closest to the EoAT 215.

Figure 13:
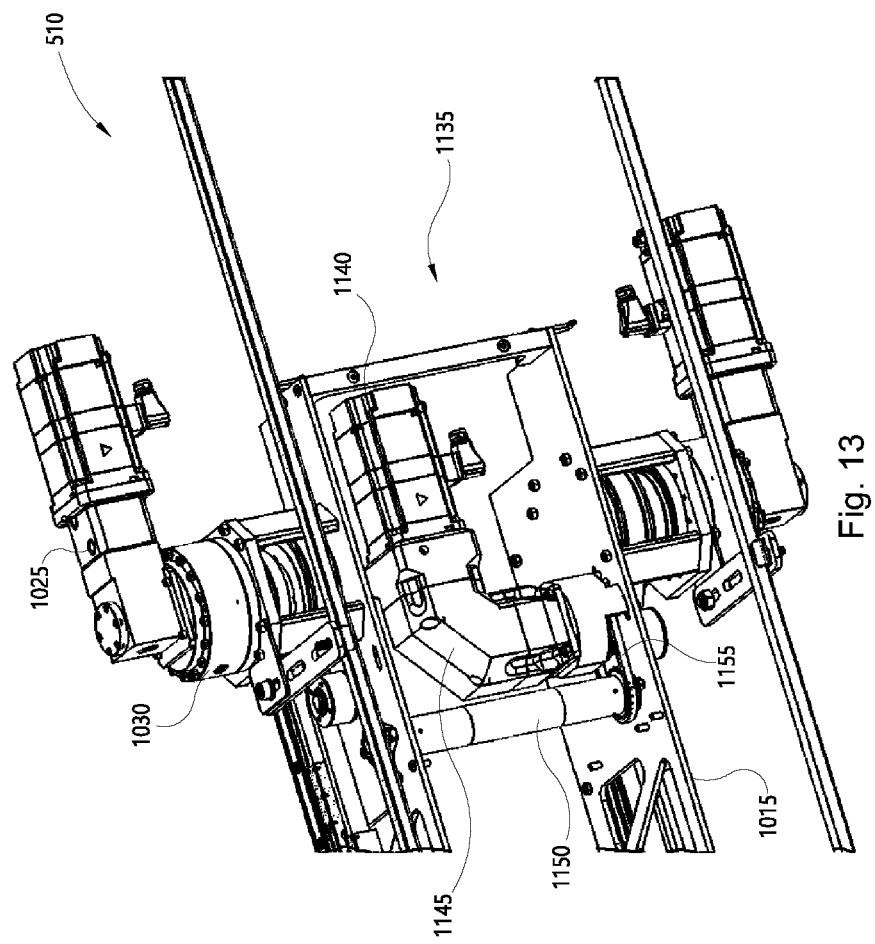
FIG. 13 is an enlarged perspective view of the FIG. 10 EoAT mast section.

Looking at FIGS. 11, 12, and 13, the bridge conveyor 515 on the EoAT mast section 510 includes a bridge idler pulley 1130 at one end proximal to the buffer conveyor 520 and a bridge drive mechanism 1135 at the opposite end. The bridge drive mechanism 1135 includes a motor 1140, a gearbox 1145 coupled to the motor 1140, a drive belt 1150, and a drive pulley 1155 connecting the gearbox 1145 to the drive belt 1150 to supply power from the motor 1140 to the drive belt 1150. In the bridge conveyor 515, the buffer conveyor belt 530 is looped around the bridge idler pulley 1130 at one end and the drive belt 1150 at the other end. As can be seen, the bridge drive mechanism 1135 is positioned at the same end as the transition conveyor belts 1125 so as to make the end of the EoAT mast section 510 with the EoAT 215 as light as possible to conserve energy. In the illustrated embodiment, the drive pulley 1155 operatively couples the drive belt 1150 to the motor 1140, but the drive belt 1150 can be driven in other ways, such as through a chain or driveshaft. As shown, the EoAT mast section 510 further includes a vacuum manifold 1160 for controlling and supplying a vacuum or suction to vacuum or suction cups on the EoAT 215.

Figure 14:
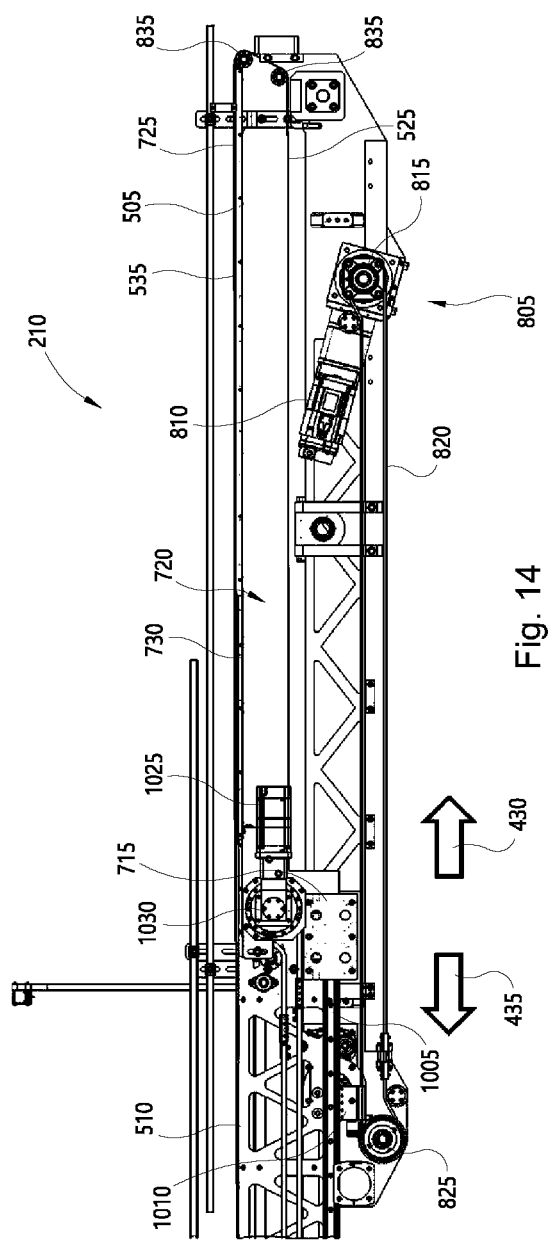
FIG. 14 is a second side view of the FIG. 5 mast.
Figure 15:
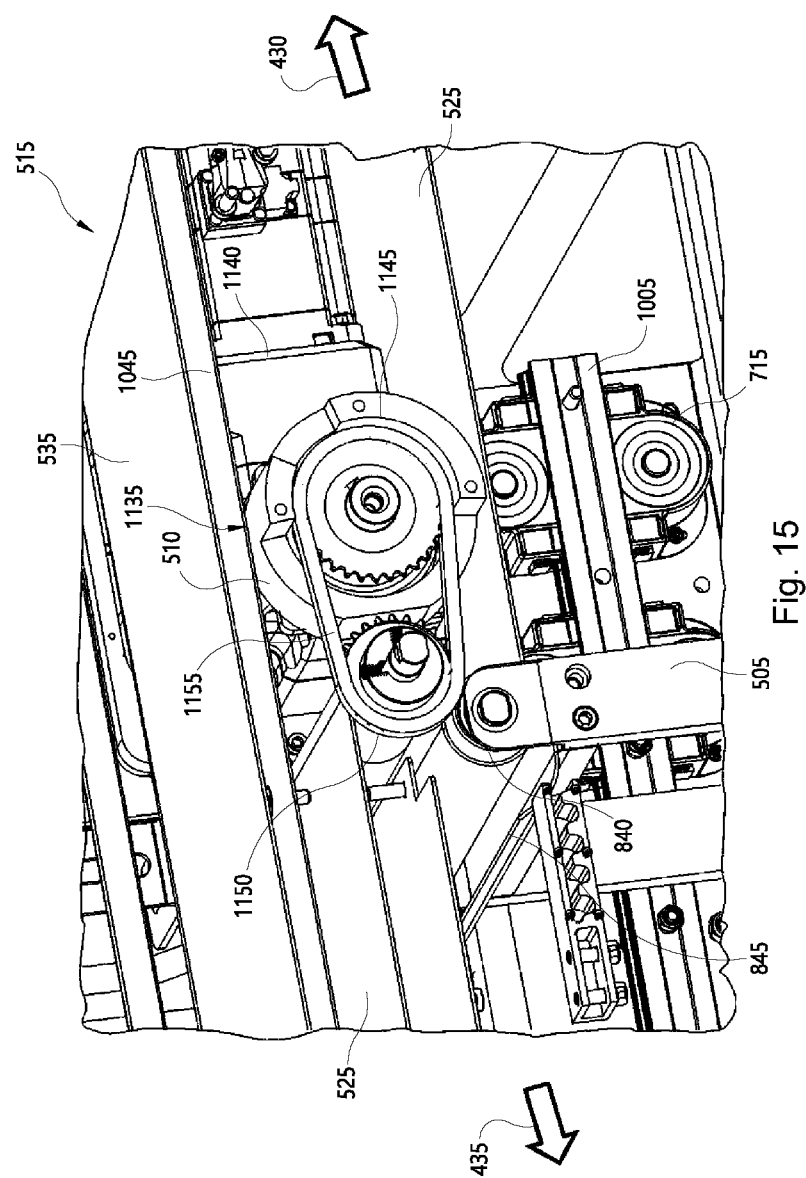
FIG. 15 is an enlarged perspective view of the interface between the FIG. 7 base mast section and the FIG. 10 EoAT mast section.

A technique for extending and retracting the mast 210 will now be described with reference to FIGS. 14 and 15. FIG. 14 shows a side view of the mast 210 with selected components removed to enhance visibility. FIG. 15 show an enlarged perspective view of the bridge conveyor belt 525 at the interface between the base mast section 505 and EoAT mast section 510. Once more, the EoAT mast section 510 is secured to the drive belts 820 of the drive mechanism 805 via the drive belt clamps 1010. The bearing rails 1005 of the EoAT mast section 510 are received in the rail bearings 715 of the base mast section 505 to allow the EoAT mast section 510 slide or move relative to the base mast section 505. To move the EoAT mast section 510 in the retracted direction 430 or the extended direction 435, the motor 810 through the gearbox 815 moves the drive belts 820 in the appropriate direction. Moving the drive belts 820 in turn moves the EoAT mast section 510 via the drive belt clamps 1010. As noted before, the base mast section 505 has the EoAT drive motor slots 720 in which the gearboxes 1030 of the motors 1025 for the EoAT actuator drive 1020 move.

Looking at FIG. 15, the bridge conveyor belt 525 is threaded in a serpentine or 5-pattern between the drive belt 1150 of the bridge drive mechanism 1135 on the EoAT mast section 510 and the bridge take-up pulley 840 of the base mast section 505. This arrangement allows the bridge conveyor 515 to operate and transport cargo 125 with the mast 210 at variable lengths as a result of extension and retraction of the mast 210. As the EoAT mast section 510 moves in the retracted direction 430, the drive belt 1150 pulls on the bridge conveyor belt 525 to put the excess slack in the bridge conveyor belt 525 underneath the bridge conveyor bed 535. During retraction, the bridge take-up pulley 840 remains stationary as the buffer idler pulleys 1105 of the bridge drive mechanism 1135 move in the retracted direction 430. This creates a longer U-shaped loop segment of the bridge conveyor belt 525 between the bridge take-up pulley 840 and buffer idler pulleys 1105 so as to take up the excess slack in the bridge conveyor belt 525. The motor 1140 through the drive belt 1150 is still able to power or drive the bridge conveyor belt 525 regardless of the length of the mast 210. Taking up this excess slack allows the bridge conveyor belt 525 of the bridge conveyor 515 to operate even when in a retracted position. Conversely, when the EoAT mast section 510 is extended in the extended direction 435, the drive belt 1150 of the bridge drive mechanism 1135 move towards the relatively fixed bridge take-up pulley 840 such that there is less slack in the bridge conveyor belt 525 underneath the bridge conveyor bed 535. When the EoAT mast section 510 is at a full or partial extended position, the bridge drive mechanism 1135 is still able to move the bridge conveyor belt 525 of the bridge conveyor 515.

Figure 16:
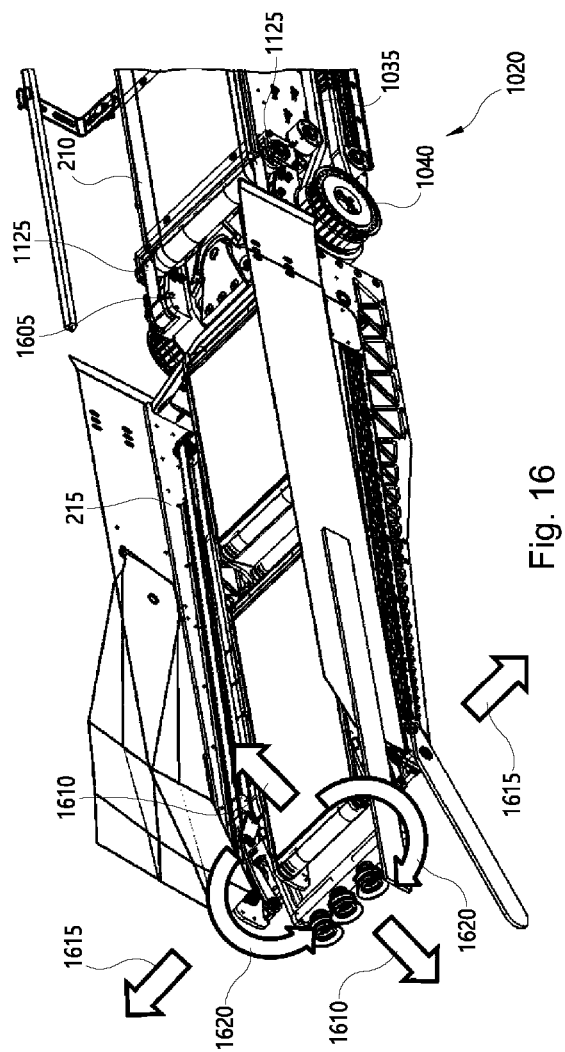
FIG. 16 is a top perspective view of an EoAT attached to the FIG. 5 mast.
Figure 17:
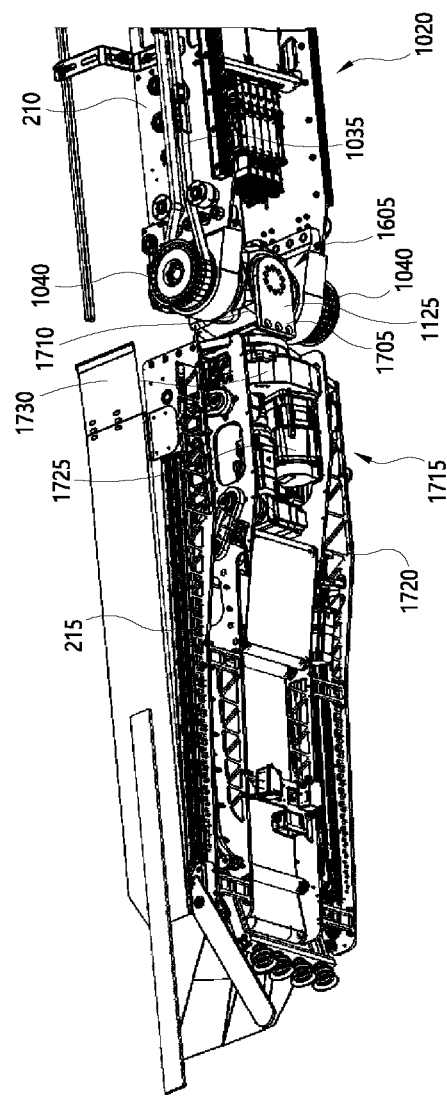
FIG. 17 is a bottom perspective view of the FIG. 16 EoAT attached to the FIG. 5 mast.
Figure 18:
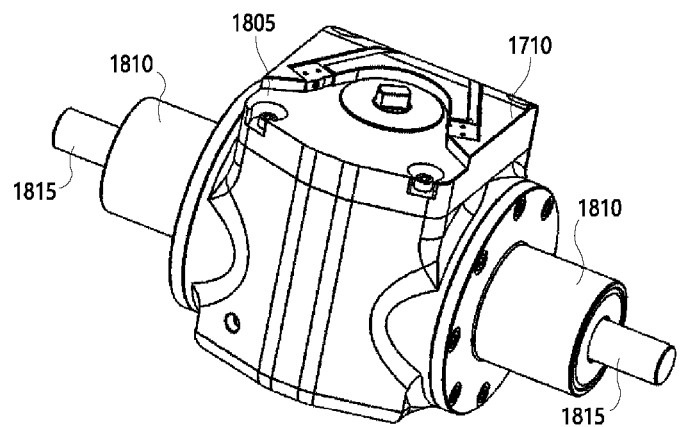
FIG. 18 is a top perspective view of an actuator gearbox used to move the FIG. 16 EoAT.

Turning to FIGS. 16 and 17, an EoAT actuator joint 1605 connects the mast 210 to the EoAT 215. The EoAT actuator joint 1605 is configured to move the EoAT 215 in pitch directions 1610 (e.g., up and down) and yaw directions 1615 (e.g., side-to-side). During shipping and in other situations, some of the cargo 125, such as boxes, may shift or tip over to be crooked. The EoAT 215 is further configured to rotate in roll directions 1620 (e.g., twist) relative to the mast 210. The EoAT actuator drive 1020 via the EoAT drive belts 1035 and EoAT drive pulleys 1040 moves the EoAT 215 in the pitch directions 1610 and yaw directions 1615 via the EoAT actuator joint 1605.

Turning to FIG. 17, the EoAT actuator joint 1605 includes an EoAT bracket 1705 rotatably mounted to the EoAT 215 and an actuator gearbox 1710 received in the EoAT bracket 1705. The EoAT actuator joint 1605 includes a roll drive mechanism 1715 that is secured in a fixed manner to a frame 1720 of the EoAT 215. The roll drive mechanism 1715 includes a motor 1725 with a gearbox 1730 that is coupled to the EoAT bracket 1705. As will be explained in greater detail below, the motor 1725 and gearbox 1730 of the roll drive mechanism 1715 are configured to rotate the EoAT bracket 1705 relative to the EoAT 215 so that the EoAT 215 is able to move in the roll directions 1620.

Figure 19:
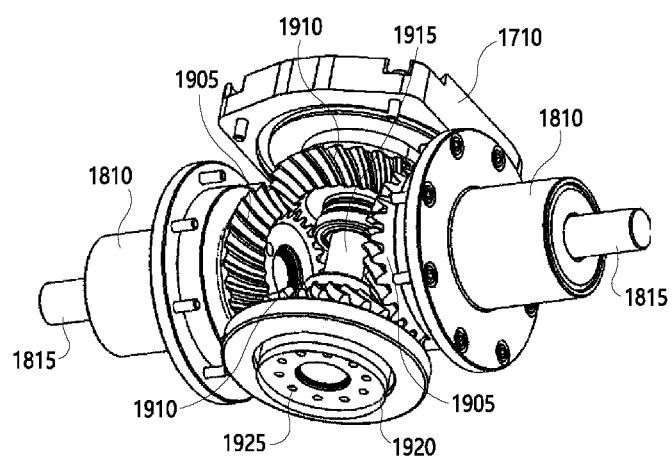
FIG. 19 is a bottom perspective view of the FIG. 18 actuator gearbox.
Figure 20:
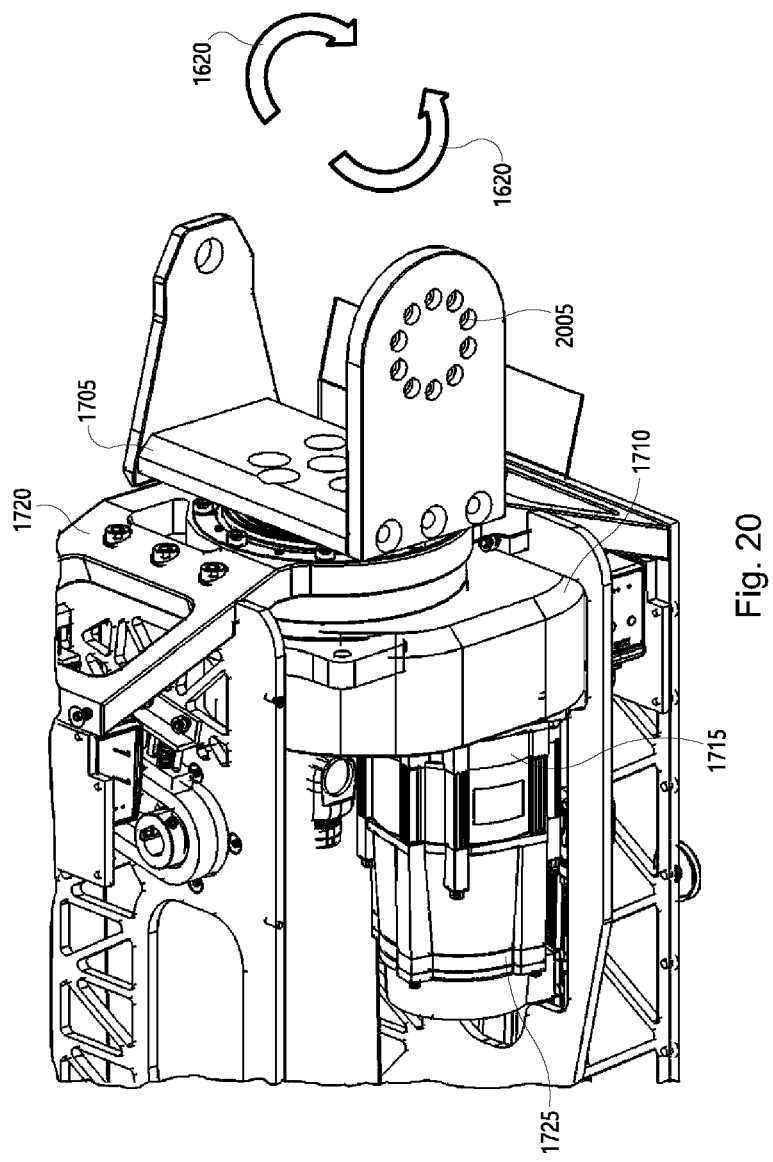
FIG. 20 is an enlarged perspective view of one end of the FIG. 16 EoAT.

Looking at FIG. 19, the actuator gearbox 1710 includes a housing 1805. On opposing sides of the housing 1805, the actuator gearbox 1710 has one or more actuator drive bearings 1810 in which actuator drive shafts 1815 are rotatably received. The ends of the actuator drive shafts 1815 are secured to the EoAT drive pulleys 1040 so that the EoAT actuator drive 1020 is able to rotate the actuator drive shafts 1815 relative to the housing 1805. As shown in FIG. 19, the actuator gearbox 1710 further includes one or more pinion gears 1905 that are secured to the opposite ends of the actuator drive shafts 1815. The pinion gears 1905 engage one or more rack gears 1910 that are secured at opposite ends of a yaw pivot shaft 1915. Each of the gears has gear teeth that intermesh with one another. In the illustrated example, the gear teeth are helical type gear teeth to ensure proper engagement, especially when high torques are applied, but other types of teeth arrangements can be used in other examples. One end of the yaw pivot shaft 1915 and the rack gears 1910 has a connector plate 1920 that is secured to the EoAT bracket 1705. In the illustrated example, the connector plate 1920 has one or more fastener openings 1925. As illustrated in FIG. 20, the EoAT bracket 1705 has similarly configured fastener holes 2005 for receiving fasteners (e.g., screws) that are secured in the fastener openings 1925 of the actuator gearbox 1710 for securing the connector plate 1920 to the EoAT bracket 1705. It should be recognized that the EoAT bracket 1705 and connector plate 1920 can be secured in other ways.

By the EoAT actuator drive 1020 rotating the pinion gears 1905 in the same direction (as viewed from one side of the actuator gearbox 1710), the rack gears 1910 do not rotate such that the EoAT actuator drive 1020 is able to pitch or move the EoAT 215 in the pitch directions 1610 (FIG. 16). When the EoAT actuator drive 1020 rotates the pinion gears 1905 via the actuator drive shafts 1815 in opposite directions, the rack gears 1910 are able to rotate relative to the housing 1805 such that the EoAT actuator drive 1020 is able to move the EoAT 215 in the yaw directions 1615. As depicted in FIGS. 15, 16, and 20, the motor 1725 of the roll drive mechanism 1715 via the actuator gearbox 1710 is able to rotate the EoAT bracket 1705 in the roll directions 1620. Rotating the EoAT bracket 1705 in such a manner causes the EoAT 215 to rotate in the roll directions 1620. Once more, rotating the EoAT 215 in the roll directions 1620 allows the EoAT 215 to engage and move cargo 125, such as boxes, that are not level or have been dislodged from a stack of boxes or other cargo 125.

Figure 21:
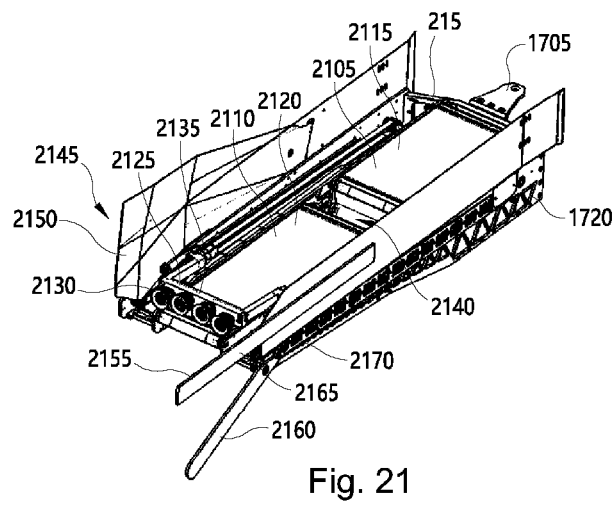
FIG. 21 is a front perspective view of the FIG. 16 EoAT.
Figure 22:
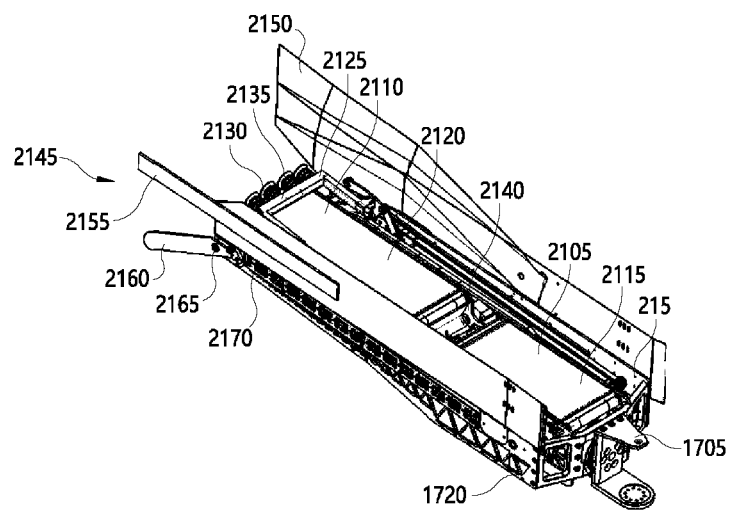
FIG. 22 is a rear perspective view of the FIG. 16 EoAT.
Figure 23:
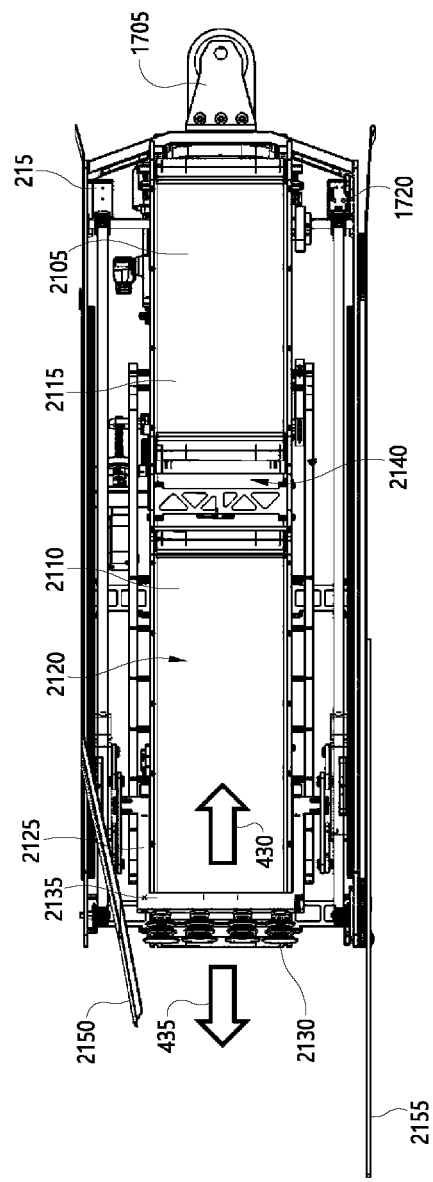
FIG. 23 is a top perspective view of the FIG. 16 EoAT.

Font and rear perspective views of the EoAT 215 are shown in FIGS. 21 and 22, respectively, and FIG. 23 shows a top view of the EoAT 215. As can be seen, the EoAT 215 includes a number of unique features that enhance handling of the cargo 125. With improved handling of the EoAT 215, the robotic system 100 is able operate for longer periods without human intervention, and the robot 105 is able to recover quicker from a number of problematic scenarios. The EoAT 215 includes a first, proximal conveyor 2105 and a second, distal conveyor 2110. Among other things, the proximal conveyor 2105 and distal conveyor 2110 can operate at different speeds to facilitate queuing and buffering of the cargo 125. For example, the proximal conveyor 2105 can operate at an intermediate speed as compared to the speed of the distal conveyor 2110 and the buffer conveyor 520 (as well as the transition conveyors 1120) of the mast 210 to facilitate a smoother transition of the cargo 125 between the mast 210 and the EoAT 215. The proximal conveyor 2105 can also buffer the cargo 125 while the cargo 125 on the distal conveyor 2110 is loaded on or unloaded from the distal conveyor 2110. Both the proximal conveyor 2105 and distal conveyor 2110 in the illustrated example are powered, belt type conveyors, but other types of conveyors can be used.

The proximal conveyor 2105 further includes a proximal conveyor belt 2115, and the distal conveyor 2110 includes a distal conveyor belt 2120. The EoAT 215 includes a gripper mechanism 2125 configured to move along the frame 1720 to pull cargo 125 onto the distal conveyor 2110 of the EoAT 215 and to push the cargo 125 off the distal conveyor 2110. The gripper mechanism 2125 includes one or more suction cups 2130 for securing the cargo 125 to the gripper mechanism 2125 via a vacuum or suction. Alternatively or additionally, other types of devices (e.g., magnets, clamps, hooks, etc.) on the gripper mechanism 2125 can be used to secure or grip the cargo 125 to the gripper mechanism 2125. The suction cups 2130 are secured to a gripper member 2135 of the gripper mechanism 2125. As can be seen, both the proximal conveyor belt 2115 and distal conveyor belt 2120 extend substantially across the entire bed width of the EoAT 215. As such, the proximal conveyor 2105 and distal conveyor 2110 are able to provide a relatively large contact area for the cargo 125. The larger contact area not only improves frictional engagement but also allows the EoAT 215 to handle a wide variety of sized and shaped cargo 125. The gripper member 2135 of the gripper mechanism 2125 is designed to span across the distal conveyor belt 2120 as the gripper member 2135 moves to allow the EoAT 215 to have the wider distal conveyor 2110. This also allows the gripper member 2135 to be wider so as to incorporate more and/or larger suction cups 2130. The gripper mechanism 2125 is designed to move in the retracted direction 430 and extended direction 435 along the distal conveyor 2110. As shown, the EoAT 215 has a carriage gap 2140 between the proximal conveyor 2105 and distal conveyor 2110 where the gripper member 2135 is able to nest below the level of the conveyor beds of the proximal conveyor 2105 and distal conveyor 2110 so that the cargo 125 can travel over the gripper member 2135 nested in the carriage gap 2140.

At the distal end, the EoAT 215 has one or more guide members 2145 for guiding, moving, steadying, and/or manipulating the cargo 125. On one side of the EoAT 215, the guide members 2145 include a shoehorn member 2150, and on the opposite side, the guide members 2145 include a location member 2155 and a rocker arm 2160. The rocker arm 2160 dangles and extends below the location member 2155 at a transverse angle. The rocker arm 2160 is pivotally connected to the frame 1720 of the EoAT 215 via a pivot connector 2165, such as a pivot bolt. The rocker arm 2160 is held in place at the acute transverse angle relative to the location member 2155 by a stop member 2170. The guide members 2145 are made of flexible material such as steel and/or plastic so as to provide some give when contacting the cargo 125 or other objects such as the walls of the cargo carrier 120 and building 130. The rocker arm 2160 is pivotally mounted to the EoAT 215 so that the rocker arm 2160 is able to pivot up when contacting the floor of the cargo carrier 120 or building 130.

Figure 24:
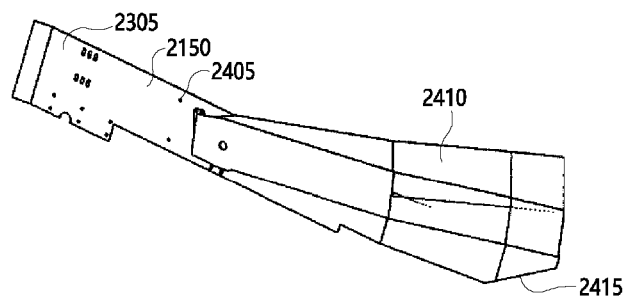
FIG. 24 is a side perspective view of a shoehorn member used in the FIG. 16 EoAT.
Figure 25:
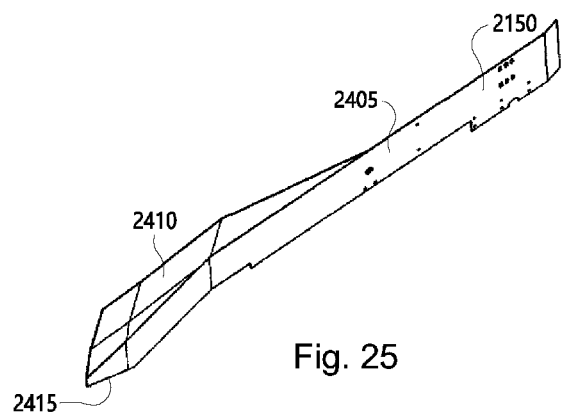
FIG. 25 is a front perspective view of the FIG. 24 shoehorn member.

Looking at FIGS. 23, 24, and 25, the distal end of the shoehorn member 2150 is bent in an inwards direction so that when the cargo 125 is unloaded from the EoAT 215, the cargo 125 is pressed against the location member 2155. This helps to locate the cargo 125 so that the cargo 125 can be more precisely located and stacked. The location member 2155 in essence acts as a probe for locating the cargo 125. As shown in FIGS. 24 and 25, shoehorn member 2150 has a guide rail body 2405 that helps to retain the cargo 125 when transported on the EoAT 215. Again, at the distal end, the shoehorn member 2150 has a fan section 2410 that extends from the guide rail body 2405 in a fan like manner so as to be wider than the guide rail body 2405. Having the fan section 2410 being wider, the shoehorn member 2150 helps to properly center and retain the cargo 125. The shoehorn member 2150 can also act like a shoehorn for placing cargo 125 into tight packing arrangements such as next to a wall. The fan section 2410 further has a beveled edge 2415 to prevent the shoehorn member 2150 from catching when the EoAT 215 is angled.

Figure 26:
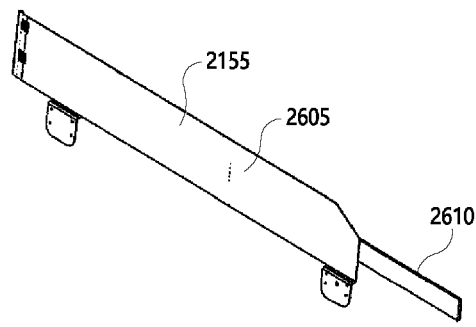
FIG. 26 is a perspective view of a location member used in the FIG. 16 EoAT.

Referring to FIG. 26, the location member 2155 includes a guide rail body 2605 that helps to retain the cargo 125 when transported on the EoAT 215. The location member 2155 further has a probe member 2610 that extends in a straight manner from the distal end of the guide rail body 2605. In some use cases, the probe member 2610 acts as location probe for locating the EoAT 215 relative to the cargo 125. The probe member 2610 creates some space during packing or unpacking of the cargo 125.

Figure 27:
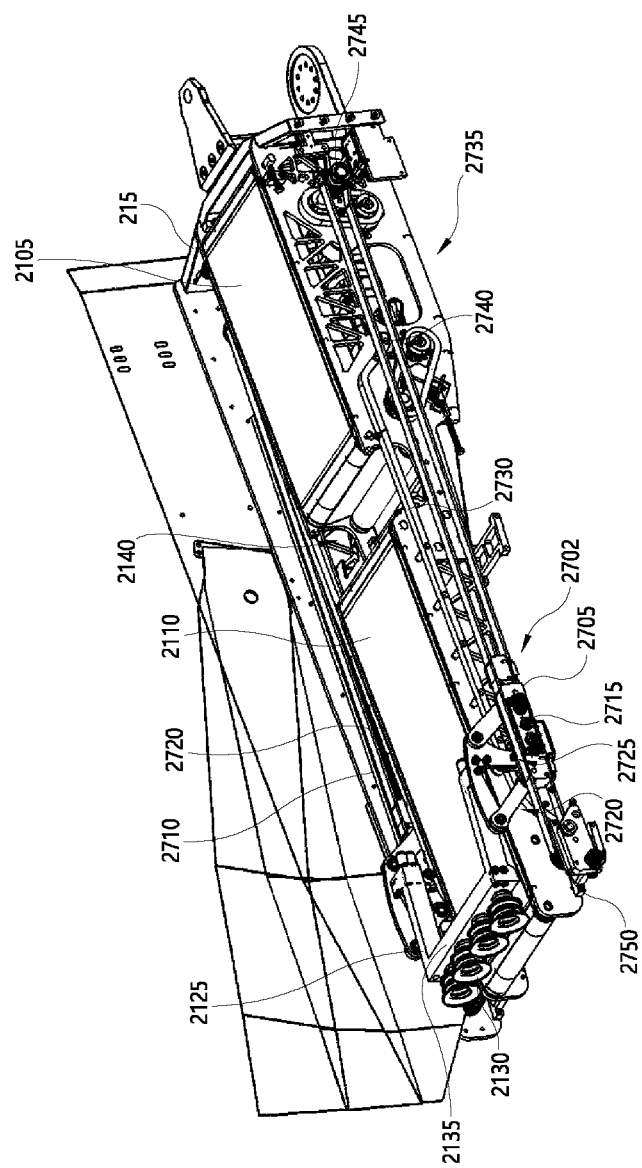
FIG. 27 is an enlarged perspective view of the FIG. 16 EoAT.
Figure 28:
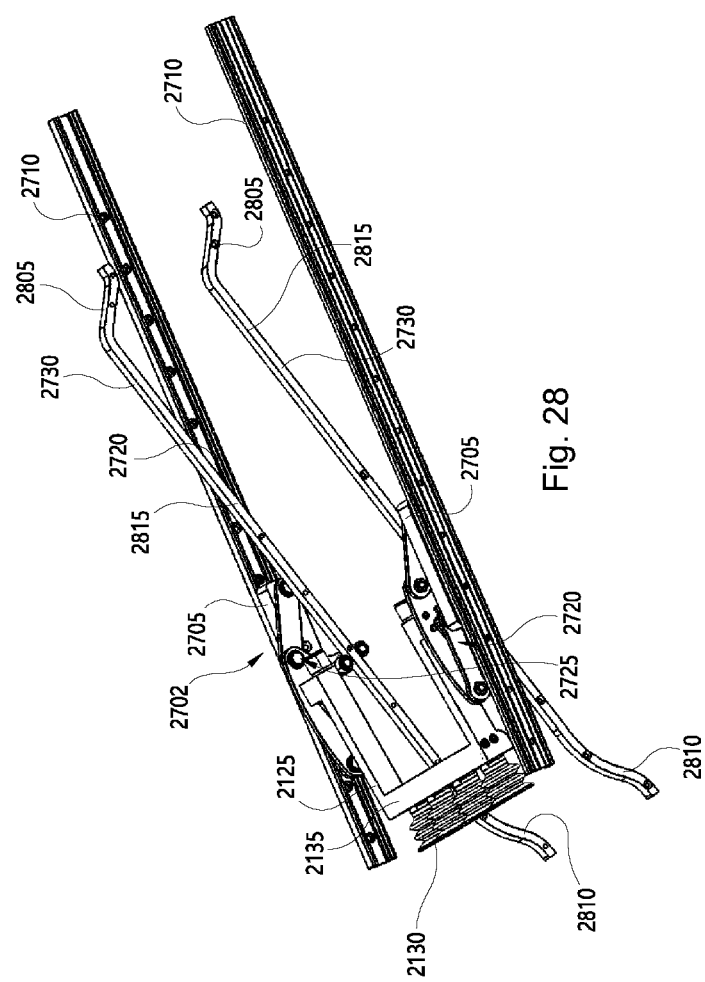
FIG. 28 is a front perspective view of a gripper mechanism and cam rails used in the FIG. 16 EoAT.

Turning to FIGS. 27 and 28, the gripper mechanism 2125 further includes a carriage 2702 with one or more carriage sliders 2705 that are slidably coupled to one or more bearing rails 2710. In the illustrated example, the carriage sliders 2705 along with the bearing rails 2710 are positioned on opposite sides of the EoAT 215. Each of the carriage sliders 2705 includes one or more bearing rollers 2715 received in corresponding linkage assemblies 2720 in the bearing rails 2710. The bearing rails 2710 in the depicted example are substantially straight such that the carriage sliders 2705 generally travel along a linear path.

The carriage 2702 is linked to the gripper member 2135 via one or more linkage assemblies 2720. The linkage assemblies 2720 have cam followers 2725 that engage with one or more corresponding cam rails 2730. To facilitate spanning of the gripper member 2135 across the distal conveyor 2110, the linkage assemblies 2720 are positioned on opposite sides of the distal conveyor 2110. As the carriage 2702 of the gripper mechanism 2125 travels in the retracted direction 430 and extended direction 435 (FIG. 23) along the bearing rails 2710, the cam rails 2730 via the cam followers 2725 raise and lower the gripper member 2135. To move the gripper mechanism 2125 along the bearing rails 2710, the EoAT 215 has a carriage drive system 2735. The carriage drive system 2735 in the depicted example includes one or more drive belts 2740 that are looped between corresponding drive motors 2745 and idler pulleys 2750. The carriage sliders 2705 are clamped to the drive belts 2740 such that as the drive motor 2745 moves the drive belts 2740, the gripper mechanism 2125 moves. The drive motor 2745 in one form includes a reversible electric motor, but other types of motors can be used in other examples.

Looking at FIG. 28, the cam rails 2730 are shaped to raise and lower the gripper member 2135 as the gripper mechanism 2125 moves. As illustrated, the cam rails 2730 include retracted sections 2805 where the gripper member 2135 is at or below the proximal conveyor 2105 and the distal conveyor 2110 so that cargo 125 is unobstructed by the EoAT 215 and can travel over the gripper member 2135. As alluded to before, when the cam followers 2725 are at the retracted sections 2805, the gripper member 2135 is retracted inside the carriage gap 2140 (FIG. 27) between the proximal conveyor 2105 and the distal conveyor 2110. Opposite the retracted sections 2805, the cam rails 2730 have extended sections 2810. At the extended sections 2810, the profile of the cam rails 2730 is lowered. When the cam followers 2725 are at the extended sections 2810, the gripper mechanism 2125 is at an extended position where the cargo 125 is either being pushed off the EoAT 215 or being pulled onto the EoAT 215 by being gripped with the suction cups 2130. The extended sections 2810 lower the gripper member 2135 so that the EoAT 215 is able to reach the cargo 125 at lower locations as well as to grip a lower area of the cargo to facilitate pulling of the cargo 125, such as boxes, from stacks of boxes. With the gripper member 2135 lower, the gripper mechanism 2125 tends to grip the lower section of the cargo 125 which in turn enhances stability when transitioning to and from the EoAT 215. This profile also gives the gripper mechanism 2125 enough vertical travel so as to pick the cargo 125 off of the floor. Between the retracted sections 2805 and the extended sections 2810, the cam rails 2730 have transition sections 2815. When the cam followers 2725 travel along the transition sections 2815, the gripper member 2135 is raised above the top surface of the distal conveyor 2110 so that the gripper member 2135 remains above the distal conveyor 2110. With the gripper member 2135 raised above the distal conveyor 2110, the gripper member 2135 via the suction cups 2130 is able to pull the cargo 125 onto the distal conveyor 2110 during unpacking or unloading of cargo 125 from the cargo carrier 120. During packing or loading of the cargo carrier 120, the gripper member 2135 of the gripper mechanism 2125 is able to push the cargo 125 from the EoAT 215.

Figure 29:
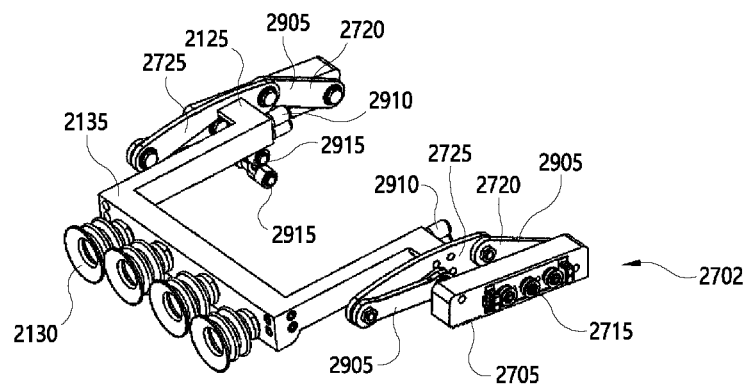
FIG. 29 is a top perspective view of the FIG. 28 gripper mechanism.
Figure 30:
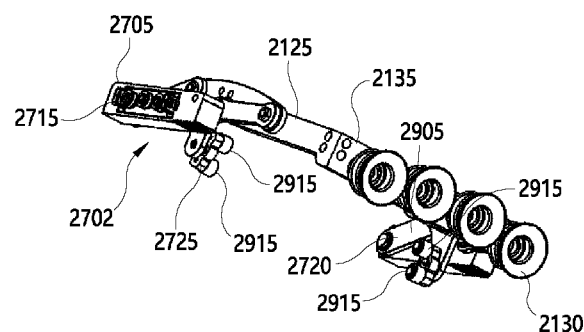
FIG. 30 is a front perspective view of the FIG. 28 gripper mechanism.
Figure 31:
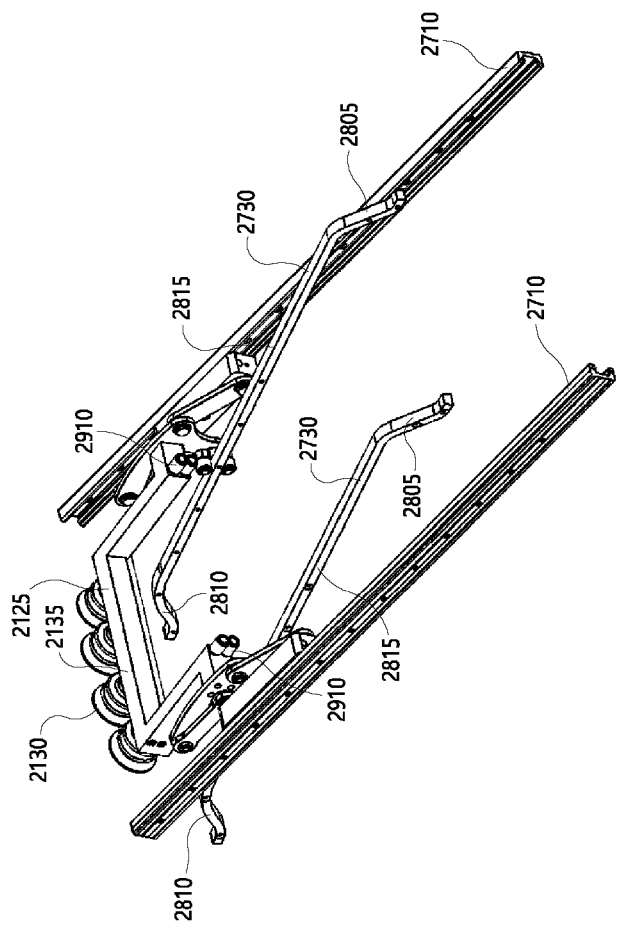
FIG. 31 is a rear perspective view of the FIG. 28 gripper mechanism and cam rails.

Referring to FIGS. 29, 30, and 31, the linkage assemblies 2720 each include one or more linkages 2905 that pivotally connect the carriage sliders 2705 to the cam followers 2725. In the depicted example, each of the linkage assemblies 2720 have two (2) linkages 2905 that connect the carriage sliders 2705 to the cam followers 2725 in a parallelogram shaped arrangement. The gripper member 2135 has one or more vacuum ports 2910 for supplying a vacuum or suction to the suction cups 2130. In other words, the vacuum ports 2910 form a vacuum manifold between the suction cups 2130 and the vacuum ports 2910 so that the suction cups 2130 are able to draw a vacuum in order to grip the cargo 125. To prevent disengagement of the cam followers 2725 from the cam rails 2730, each of the cam followers 2725 have at least a pair of cam rollers 2915 positioned on opposite sides of each of the cam rails 2730, as is for example depicted in FIG. 31.

A technique for operating the robotic system 100 will now be described with reference to FIGS. 1, 2, 4, 5, 32, and 33. As noted before, the robot 105 is designed to load and unload the cargo 125 from the cargo carriers 120. The technique will be described and illustrated with respect to unloading and loading one or more boxes 3205 (FIG. 32), but it should be recognized that other types of cargo 125 can be loaded and unloaded with the robot 105. To load a particular cargo carrier 120 with the boxes 3205, the wheels 225 of the robot 105 are positioned in front of the loading dock 135 with the cargo carrier 120 to be serviced. During movement of the robot 105, the mast 210 can be retracted or extended to avoid obstacles in the manner described before. Once at the loading dock 135, at least the mast 210 is extended and moved to a position inside the cargo carrier 120 where the boxes 3205 are to be stacked. Via the main conveyer system 115 and extendable conveyor 110, the boxes 3205 are loaded onto the base unit conveyor 235 of the robot 105. From the base unit conveyor 235, the boxes 3205 travel along the bridge conveyor 515 and buffer conveyor 520 on the mast 210. Once more, the buffer conveyor 520 can be used to buffer the boxes 3205 that are supplied to the EoAT 215 to enhance loading and operational throughput. From the buffer conveyor 520, the boxes 3205 travel along the transition conveyor belts 1125 (FIG. 11) and onto the proximal conveyor 2105 of the EoAT 215.

Before the boxes 3205 are transported onto the distal conveyor 2110, the gripper member 2135 of the gripper mechanism 2125 is moved in the retracted direction 430 to a retracted position inside the carriage gap 2140. When the gripper member 2135 is in the carriage gap 2140, the gripper member 2135 is located at or below the top surface of the proximal conveyor 2105 and distal conveyor 2110 such that the boxes 3205 are able to travel over the gripper member 2135 of the gripper mechanism 2125 and onto the distal conveyor 2110. The distal conveyor 2110 moves the boxes 3205 along the EoAT 215. At the same time or shortly thereafter, the gripper member 2135 is moved in the extended direction 435 such that the gripper member 2135 is located above the top surface of the distal conveyor 2110. The suction cups 2130 of the gripper mechanism 2125 are then able to push the box 3205 in the extended direction 435.

Figure 32:
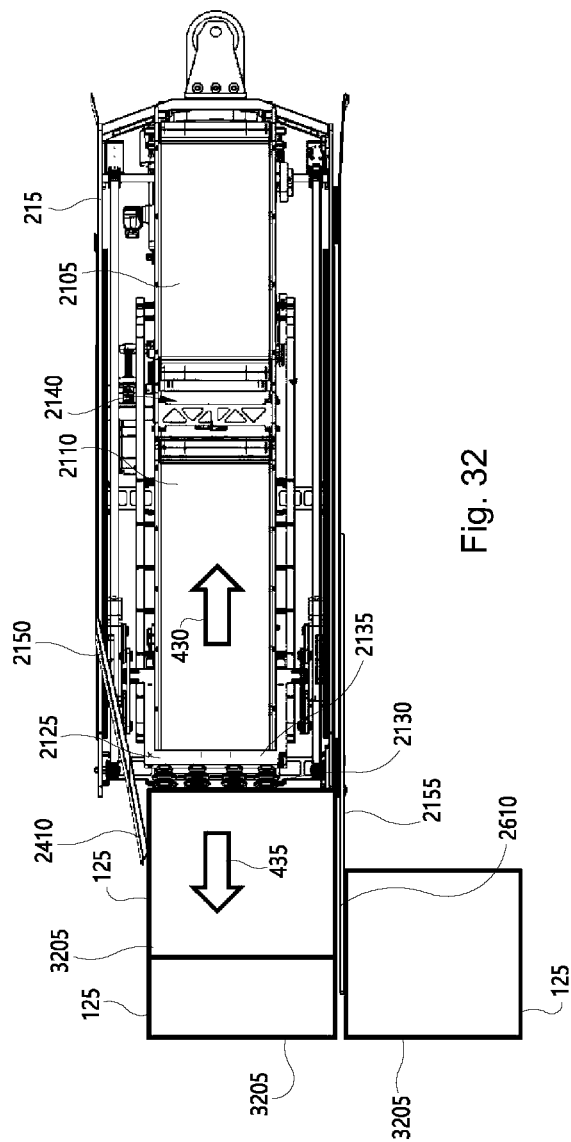
FIG. 32 is a top perspective view of the FIG. 16 EoAT servicing boxes.
Figure 33:
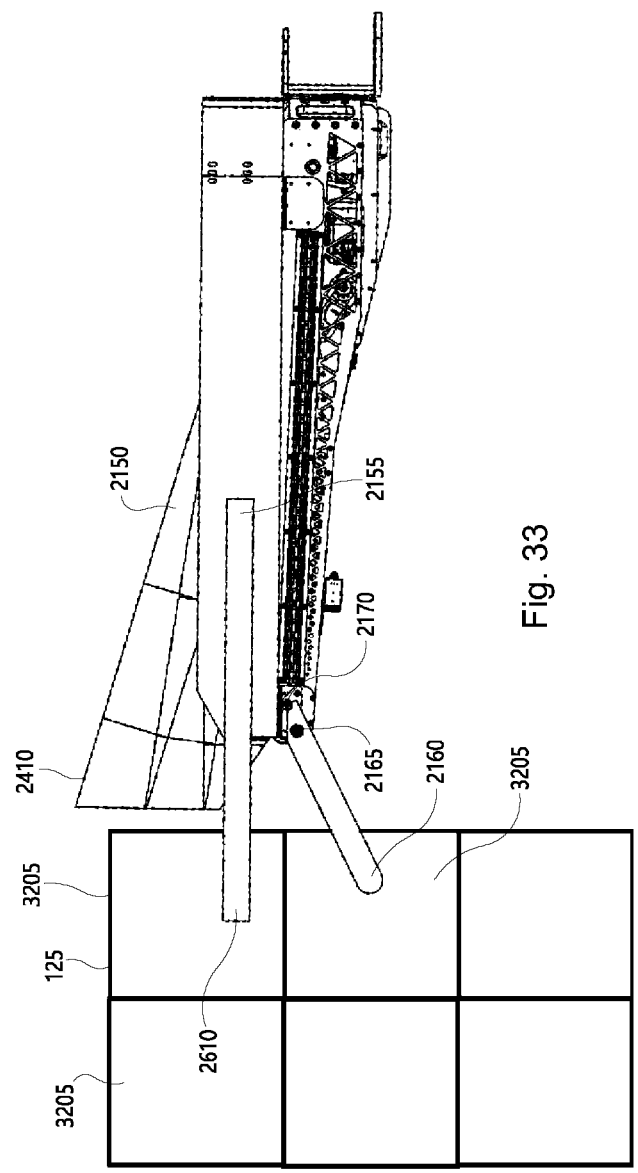
FIG. 33 is a side view of the FIG. 16 EoAT servicing the boxes.

As can be seen in FIGS. 32 and 33, the boxes 3205 are stacked in horizontal rows and vertical columns inside the cargo carrier 120. Before loading the box 3205 onto the stack of boxes 3205, the probe member 2610 of the location member 2155 is positioned by the previously stacked box 3205 in the row or by the wall of the cargo carrier 120. The rocker arm 2160 contacts the box 3205 just below where the box 3205 to be discharged is to be stacked to help steady the lower box 3205. As the gripper mechanism 2125 pushes the box 3205 in the extended direction 435, the angled fan section 2410 of the EoAT 215 pushes the box 3205 against the location member 2155 to help orient and position the box 3205. The EoAT 215 then pushes or discharges the box 3205 from the distal conveyor 2110 of the EoAT 215. The gripper mechanism 2125 then is able to nudge the now stacked box 3205 into the final stacked resting place. The mast 210 moves the EoAT 215 to the next appropriate row or column of boxes 3205, and the loading technique is repeated in a similar fashion until the cargo carrier 120 is properly loaded.

Figure 34:
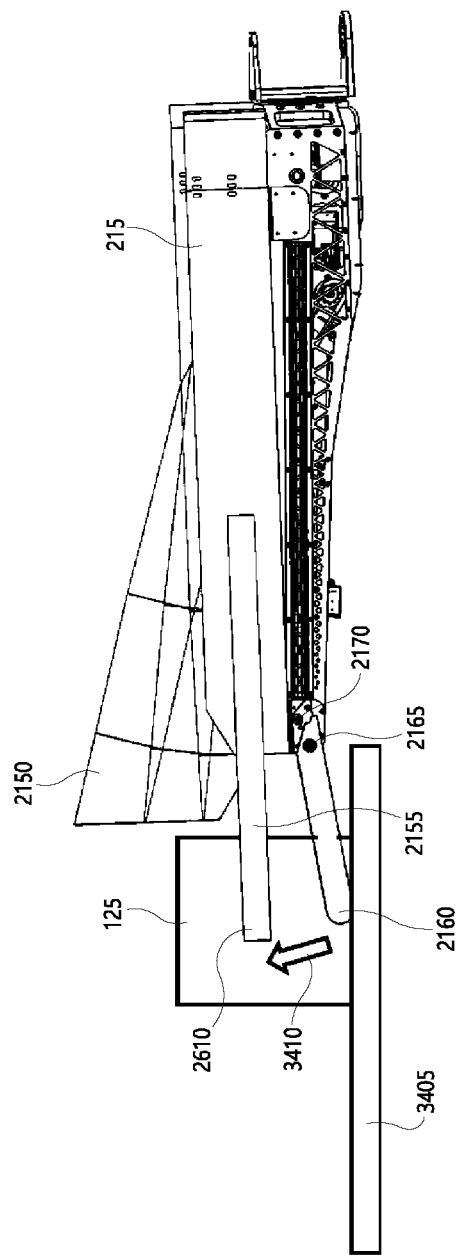
FIG. 34 is a side view of the FIG. 16 EoAT servicing a box on a floor.

Turning to FIG. 34, the EoAT 215 is designed to load or unload the boxes 3205 even when close to a floor 3405 of the cargo carrier 120 or the building 130. As noted before, the rocker arm 2160 dangles from the end of the EoAT 215 at an acute angle via the pivot connector 2165 and stop member 2170. This allows the rocker arm 2160 to pivot or otherwise move when near the floor 3405. As shown, the rocker arm 2160 pivots about the pivot connector 2165 in a direction indicated by arrow 3410 when the rocker arm 2160 contacts the floor 3405. Once the EoAT 215 is raised away from the floor 3405, gravity causes the rocker arm 2160 to pivot back to the original orientation. The stop member 2170 helps to limit or locate the rocker arm 2160 at the proper angle or location.

Figure 35:
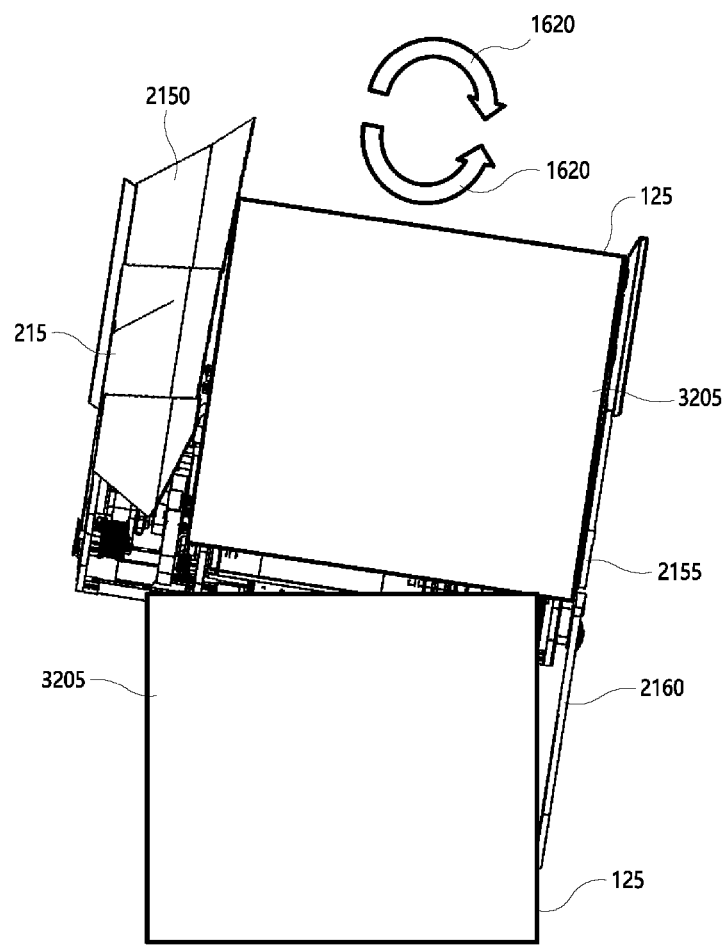
FIG. 35 is a perspective view of the FIG. 16 EoAT moving a tilted box.

The unloading process generally moves the boxes 3205 in the opposite manner as described above. The base unit 205 and/or mast 210 positions the EoAT 215 to face the boxes 3205 to be unloaded from the cargo carrier 120. Looking again at FIGS. 32 and 33, the probe member 2610 of the location member 2155 is positioned to support the box 3205 to be unloaded, and the rocker arm 2160 contacts the box 3205 below to help stabilize the lower box 3205 to reduce the risk of toppling. Looking at FIG. 35, the EoAT 215 is able to rotate in the roll directions 1620 via the roll drive mechanism 1715 (FIG. 17) to move or engage a tipped or dislodged box 3205. The gripper member 2135 of the EoAT 215 is moved in the extended direction 435 into an extended position, as is shown in FIG. 32. Before or during the extension of the gripper member 2135, a vacuum or suction is supplied to the suction cups 2130. The suction of the suction cups 2130 draws and secures the target boxes 3205 to the gripper mechanism 2125. Once secured, the gripper member 2135 of the gripper mechanism 2125 is moved in the retracted direction 430. Before or at the same time, the distal conveyor 2110 is powered to likewise move the box 3205 in the retracted direction 430. Once the gripper member 2135 reaches the carriage gap 2140 (or shortly before), the suction supplied to the suction cups 2130 is stopped so as to disengage the gripper mechanism 2125 from the box 3205. At the carriage gap 2140 the gripper member 2135 of the gripper mechanism 2125 is lowered below the bottom of the box 3205. The distal conveyor 2110 pushes the box 3205 over the gripper member 2135 and the proximal conveyor 2105 is powered (or remains powered) to move the box 3205 in the retracted direction 430.

From the EoAT 215, the box 3205 is transferred onto the buffer conveyor 520 of the mast 210 via the transition conveyor belts 1125 (FIG. 11). Once more, the buffer conveyor 520 can be used to buffer the boxes 3205 on the mast 210. The box 3205 is then transferred to the bridge conveyor 515. As should be recognized, multiple boxes 3205 can be moved along the mast 210 at the same time. The boxes 3205 on the mast 210 are then transferred onto the base unit conveyor 235, and from the base unit conveyor 235, the boxes 3205 are transported into the building 130 via the extendable conveyor 110 and main conveyer system 115.

This unloading technique is repeated until the appropriate number of boxes 3205 are unloaded from the cargo carrier 120.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Acute" or "Acute Angle" generally refers to an angle smaller than a right angle or less than 90 degrees.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Cargo" or "Cargo Items" generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

"Cargo Carrier" generally refers to any structure used to transport and/or store cargo items, such as flatbed trailers, trailers, semitrailers, trucks, intermodal containers, refrigerated trailers, and railcars, to just name a few examples. The cargo carrier can be transported in any number of ways, such as over land, sea, space, and/or air. Certain type of cargo carriers, like intermodal containers, are designed to be transported in a number of manners, such as via a truck, in a ship, and via rail. The cargo carrier can be fully enclosed, such as when in the form of a semi-trailer or cargo container, or open to the outside environment, such as with a flatbed trailer.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of nonlimiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Conveyor Bed" generally refers to a part of a conveyor upon which a load and/or cargo rests or slides while being conveyed.

"Conveyor Belt" or "Belt" generally refers to a flexible band or other flexible material placed around two or more pulleys for the purpose of transmitting motion, power, and/or materials from one point to another. By way of nonlimiting examples, the conveyor belt can be made of a flexible material such as rubber and/or polyvinyl chloride (PVC). The conveyor belt includes one or more layers of material such as a carcass layer and an over layer. The carcass layer is an under layer that provides strength and shape to the belt, and the over layer covers the carcass layer. Typically, but not always, the carcass layer is made of polyester, nylon, and/or cotton, and the cover layer is made of rubber and/or plastic compounds.

"Couple" or "Coupled" generally refers to an indirect and/or direct connection between the identified elements, components, and/or objects. Often the manner of the coupling will be related specifically to the manner in which the two coupled elements interact.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"End of Arm Tool" (EoAT) or "End Effector" generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but not always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

"Extended Position" generally refers to a location or state of a mechanism where at least a portion is stretched out to be longer or bigger. For example, when in the extended position, the mast and/or conveyor does not need to be stretched to the fullest extent possible (i.e., fully extended), but instead, it can be partly lengthened or enlarged (i.e., partially extended). Depending on the configuration of the cargo carrier, the mast and/or conveyor will extend inside the cargo carrier, such as with an enclosed semi-trailer, or over the cargo carrier, such as with a flatbed trailer.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Flat" generally refers to an object having a broad level surface but with little height.

"Frame" generally refers to the structure which supports the mechanical components of a conveyor and/or sorter that are configured to move items.

"Gearbox" or "Transmission" generally refers to a power system that provides controlled application of mechanical power. The gearbox uses gears and/or gear trains to provide speed, direction, and/or torque conversions from a rotating power source to another device.

"Lateral" generally refers to being situated on, directed toward, or coming from the side.

"Loading Dock" generally refers to an area of a building or other structure where cargo items for cargo carriers (usually, but not always, road, rail, or sea) are loaded and unloaded. Cargo items can be also staged at the loading dock. Loading docks are commonly found on commercial and industrial buildings, and warehouses in particular. Loading docks may be exterior, flush with the building envelope, or fully enclosed. Loading docks are not just limited to fully enclosed buildings but instead can be located at locations that are partially or fully open to the outside environment.

"Longitudinal" generally relates to length or lengthwise dimension of an object, rather than across.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Retracted Position" generally refers to a location or state of a mechanism where at least a portion is shrunk to be shorter or smaller. For example, when in the retracted position, a mast and/or conveyer is typically shorter than when in an extended position. When in the retracted position, the mast and/or conveyor does not need to be shrunk to the fullest extent possible (i.e., fully retracted), but instead, it can be partly shortened or shrunk (i.e., partially retracted).

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Vacuum" generally refers to a space or state in which air or other gas pressure is significantly lower than ambient or atmospheric pressure. A vacuum can include a full vacuum in which the space is devoid of all matter or a partial vacuum in which some gas (or other matter) is still present in the space.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 robotic system
105 robot
110 extendable conveyor
115 main conveyer system
120 cargo carrier
125 cargo
130 building
135 loading dock
205 base unit
210 mast
215 EoAT
220 transport system
225 wheels
230 controller
235 base unit conveyor
240 mast actuator
245 base unit housing
250 sensors
405 longitudinal axis
410 lateral axis
415 first lateral direction
420 second lateral direction
425 columns
430 retracted direction
435 extended direction
505 base mast section
510 EoAT mast section
515 bridge conveyor
520 buffer conveyor
525 bridge conveyor belt
530 buffer conveyor belt
535 bridge conveyor bed
705 frame
710 mast section cavity
715 rail bearings
720 EoAT drive motor slots
725 base slider bed
730 base support rails
805 drive mechanism
810 motor
815 gearbox
820 drive belts
825 driver idler pulleys
830 bridge guide rollers
835 bridge idler pulleys
840 bridge take-up pulley
845 belt shield
1005 bearing rails
1010 drive belt clamps
1015 frame
1020 EoAT actuator drive
1025 motors
1030 gearboxes
1035 EoAT drive belts
1040 EoAT drive pulleys
1045 bridge slider bed
1050 buffer slider bed
1105 buffer idler pulleys
1110 buffer guide pulleys
1115 buffer drive pulley
1120 transition conveyors
1125 transition conveyor belts
1130 bridge idler pulleys
1135 bridge drive mechanism
1140 motor
1145 gearbox
1150 drive belt
1155 drive pulley
1160 vacuum manifold
1605 EoAT actuator joint
1610 pitch directions
1615 yaw directions
1620 roll directions
1705 EoAT bracket
1710 actuator gearbox
1715 roll drive mechanism
1720 frame
1725 motor
1730 gearbox
1805 housing
1810 actuator drive bearings
1815 actuator drive shafts
1905 pinion gears
1910 rack gears
1915 yaw pivot shaft
1920 connector plate
1925 fastener openings
2005 fastener holes
2105 proximal conveyor
2110 distal conveyor
2115 proximal conveyor belt
2120 distal conveyor belt
2125 gripper mechanism
2130 suction cups
2135 gripper member
2140 carriage gap
2145 guide members
2150 shoehorn member
2155 location member
2160 rocker arm
2165 pivot connector
2170 stop member
2405 guide rail body
2410 fan section
2415 beveled edges 2605 guide rail body
2610 probe member
2702 carriage
2705 carriage sliders
2710 bearing rails
2715 bearing rollers
2720 linkage assemblies
2725 cam followers
2730 cam rails
2735 carriage drive system
2740 drive belt
2745 drive motor
2750 idler pulleys
2805 retracted sections
2810 extended sections
2815 transition sections
2905 linkages
2910 vacuum ports
2915 cam rollers
3205 boxes
3405 floor
3410 arrow

What is claimed is:

1. A system, comprising:
    a robot that has an End of Arm Tool (EoAT) mounted to a mast with a conveyor path;
    at least two bearing rails disposed on opposite sides of the EoAT;
    at least two carriage sliders slidably disposed along the bearing rails;
    at least two linkage assemblies disposed on the opposite sides of the EoAT;
    at least two cam rails disposed on the opposite sides of the EoAT;
    a gripper member configured to secure a cargo item;
    wherein the linkage assemblies link the gripper member to the Carriage sliders;
    wherein the linkage assemblies have cam followers that engage with the cam rails;
    wherein cam rails are shaped to raise and lower the gripper member;
    a conveyor disposed between the linkage assemblies; and
    wherein the gripper member spans across the conveyor.
2. The system of claim 1, wherein the mast is coupled to a base unit with one or more omnidirectional wheels.
3. The system of claim 2, wherein the mast has a bridge conveyor that is extendable and retractable.
4. The system of claim 3, wherein the bridge conveyor extends across at least two mast sections that move in a telescoping manner.
5. The system of claim 4, wherein the bridge conveyor includes a conveyor belt that is routed in an S-shaped pattern between the sections.
6. The system of claim 4, wherein the mast has a drive system to move the sections relative to one another.
7. The system of claim 1, wherein the mast includes at least two conveyor sections for buffering cargo.
8. The system of claim 7, wherein the conveyors sections include belt conveyors that extend substantially across the full width of the mast.
9. The system of claim 1, wherein the mast includes one or more transition conveyors to transport cargo between the mast and EoAT.
10. The system of claim 1, wherein the EoAT includes a roll drive configured to rotate the EoAT relative to the mast.
11. The system of claim 10, wherein the EoAT includes an actuator gearbox configured to move the EoAT in yaw and pitch directions.
12. The system of claim 11, wherein:
    the actuator gearbox includes
        at least two actuator drive shafts,
        at least two pinion gears secured at opposite ends of the actuator drive shafts,
        a yaw pivot shaft,
        at least two rack gears secured at opposite ends of the yaw pivot shaft,
        wherein the pinion gears intermesh with the rack gears,
        an EoAT bracket, and
        a connector plate secured to the EoAT bracket;
    the yaw pivot shaft is secured to the connector plate;
    the EoAT has a frame;
    the EoAT includes a roll drive configured to rotate the EoAT in a roll direction relative to the mast;
    the roll drive includes a motor secured to the frame of the EoAT; and
    the motor of the roll drive is coupled to the actuator gearbox to rotate the EoAT in the roll direction relative to the mast.
13. The system of claim 1, wherein the gripper member has one or more vacuum cups.
14. The system of claim 1, wherein the cam followers each include at least a pair of cam rollers disposed on opposite sides of the cam rails.
15. The system of claim 1, wherein the EoAT includes at least two conveyor sections for transporting cargo.
16. The system of claim 15, wherein the EoAT includes a gripper mechanism configured to nest in a retracted position between the conveyor sections.
17. The system of claim 1, wherein the EoAT includes a location member with a probe member extending from a distal end of the EoAT.
18. The system of claim 17, wherein the EoAT includes a shoehorn member configured to guide cargo against the location member.
19. The system of claim 17, wherein the EoAT include a rocker arm dangling below the probe member.
20. The system of claim 19, wherein the rocker arm is angled at an acute angle relative to the probe member.
21. The system of claim 20, wherein the rocker arm is pivotally connected to the EoAT via a pivot connector.
22. The system of claim 21, wherein the EoAT has a stop member that holds the rocker arm in position.
23. The system of claim 19, wherein the rocker arm is flexible.
24. The system of claim 1, wherein:
    the EoAT has a distal conveyor and a proximal conveyor;
    the conveyor disposed between the linkage assemblies is the distal conveyor;
    the proximal conveyor is disposed on the EoAT proximal to the mast;
    the distal conveyor is disposed on the EoAT distal to the mast;
    the EoAT defines a carriage gap between the proximal conveyor and the distal conveyor;
    the cam rails are shaped to raise the gripper member above the distal conveyor;
    the gripper member spans across the distal conveyor; and
    the cam rails are shaped to lower the gripper member into the carriage gap to nest the gripper member between the distal conveyor and the proximal conveyor.

25. The system of claim 24, wherein:
the gripper member has one or more vacuum cups;
the distal conveyor includes a distal conveyor belt;
the proximal conveyor includes a proximal conveyor belt;
the gripper member spans across the distal conveyor belt;
the EoAT has a bed width defined between the bearing rails;
the proximal conveyor belt and distal conveyor belt extend substantially across the entire bed width of the EoAT to provide a large contact area for the cargo item; and
the distal conveyor belt and the proximal conveyor belt operate at different speeds.

26. A system comprising:
a robot that has an End of Arm Tool (EoAT) mounted to a mast with a conveyor path;
wherein the EoAT includes a location member with a probe member extending from a distal end of the EoAT;
wherein the EoAT includes a shoehorn member configured to guide cargo against the location member; and
wherein the shoehorn member includes a fan section that is angled towards the location member.

27. A method, comprising:
extending a bridge conveyor of a mast of a robot in a longitudinal direction through a first loading dock;
wherein the robot has an End of Arm Tool (EoAT) mounted to the mast, wherein the EoAT includes at least two bearing rails disposed on opposite sides of the EoAT, at least two carriage sliders slidably disposed along the bearing rails, at least two linkage assemblies disposed on the opposite sides of the EoAT, a least two cam rails disposed on the opposites side of the EoAT, a conveyor disposed between the linkage assemblies, and a gripper member configured to secure a cargo item, wherein the linkage assemblies link the gripper member to the carriage sliders, wherein the linkage assemblies have cam followers that engage with the cam rails, wherein the cam rails are shaped to raise and lower the gripper member, wherein the gripper member spans across the conveyor;
transporting one or more items along the bridge conveyor through the first loading dock;
retracting the bridge conveyor in the longitudinal direction from the first loading dock;
wherein the mast is coupled to a base unit with one or more omnidirectional wheels;
moving the base unit in a lateral direction from the first loading dock to a second loading dock with the omnidirectional wheels; and
extending the bridge conveyor in the longitudinal direction through the second loading dock.

28. The method of claim 27, wherein said extending the bridge conveyor includes:
moving at least two mast sections of the mast in a telescoping manner; and
moving the sections relative to one another with a drive system of the mast.

29. The method of claim 28, further comprising:
transporting the items along at least one conveyor of the EoAT;
wherein the EoAT includes a gripper mechanism with a gripper member that spans across the conveyor of the EoAT; and
gripping the items with one or more vacuum cups of the gripper mechanism.

30. The method of claim 27, further comprising:
transporting the items along at least one conveyor of the EoAT;
wherein the gripper member has one or more vacuum cups;
gripping the items with vacuum cups of the gripper member;
wherein said retracting the bridge conveyor includes retracting the bridge conveyor to a length where the EoAT avoids hitting a support column located between the first loading dock and the second loading dock during said moving the base unit; and
wherein the EoAT is extended past the support column during said extending the bridge conveyor in the longitudinal direction through the second loading dock.

* * * * *

UNITED STATES PATENT AND TRADEMARK OFFICE
CERTIFICATE OF CORRECTION

PATENT NO. : 11,518,630 B2
APPLICATION NO. : 15/929963
DATED : December 6, 2022
INVENTOR(S) : Joe G. Zoghzoghy et al.

It is certified that error appears in the above-identified patent and that said Letters Patent is hereby corrected as shown below:

In the Claims
Column 27, Claim 27, Line 31, replace "a least two" with --at least two--

Signed and Sealed this
Fourteenth Day of February, 2023

Katherine Kelly Vidal
*Director of the United States Patent and Trademark Office*